(12) United States Patent
Toyota

(10) Patent No.: US 10,547,039 B2
(45) Date of Patent: Jan. 28, 2020

(54) BATTERY CASE FOR VEHICLE AND METHOD OF MANUFACTURING OF BATTERY CASE

(71) Applicant: TOYOTA JIDOSHA KABUSHIKI KAISHA, Aichi-ken (JP)

(72) Inventor: Masaru Toyota, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/142,118

(22) Filed: Sep. 26, 2018

(65) Prior Publication Data
US 2019/0157642 A1    May 23, 2019

(30) Foreign Application Priority Data
Nov. 17, 2017  (JP) .................................. 2017-222018

(51) Int. Cl.
  *B60K 1/04*  (2019.01)
  *H01M 2/10*  (2006.01)
  *B60L 50/60*  (2019.01)

(52) U.S. Cl.
  CPC ............. *H01M 2/1083* (2013.01); *B60K 1/04* (2013.01); *B60L 50/66* (2019.02); *H01M 2/1077* (2013.01); *B60K 2001/0438* (2013.01); *H01M 2220/20* (2013.01)

(58) Field of Classification Search
  CPC .......................... B60K 1/04; B60K 2001/0438
  USPC ..................................................... 180/68.5
  See application file for complete search history.

(56) References Cited

U.S. PATENT DOCUMENTS

| | | | | |
|---|---|---|---|---|
| 5,501,289 A | * | 3/1996 | Nishikawa | B60K 1/04 180/68.5 |
| 6,085,854 A | * | 7/2000 | Nishikawa | B60K 1/04 180/68.5 |
| 7,610,978 B2 | * | 11/2009 | Takasaki | B60K 1/04 180/68.5 |
| 7,654,352 B2 | * | 2/2010 | Takasaki | B60K 1/04 180/68.5 |
| 7,771,865 B2 | * | 8/2010 | Takasaki | B60K 1/04 429/71 |
| 7,824,797 B2 | * | 11/2010 | Nishino | B60K 1/04 429/154 |
| 7,997,368 B2 | * | 8/2011 | Takasaki | B60K 1/04 180/68.5 |

(Continued)

FOREIGN PATENT DOCUMENTS

| | | |
|---|---|---|
| DE | 102012100977 B3 | 7/2013 |
| JP | 2015-170452 A | 9/2015 |
| JP | 5977374 B2 | 8/2016 |

*Primary Examiner* — Jeffrey J Restifo
(74) *Attorney, Agent, or Firm* — Hauptman Ham, LLP

(57) ABSTRACT

In a battery case for a vehicle that houses a battery, at a vertical direction intermediate portion of one of an inner panel or an outer panel, there is formed a bulging portion which bulges out toward another of the inner panel or the outer panel and is joined to the other of the inner panel or the outer panel by spot welding, closed cross-section portions are formed at a side wall at both an upper side and a lower side of the bulging portion, respectively, and weld points of the spot welding that join the inner panel and the outer panel are disposed at positions that do not overlap with supporting members as seen from a direction in which the inner panel and the outer panel face one another.

8 Claims, 16 Drawing Sheets

(56) References Cited

U.S. PATENT DOCUMENTS

| | | | | |
|---|---|---|---|---|
| 8,079,435 | B2 * | 12/2011 | Takasaki | B60K 1/04 180/68.5 |
| 8,336,658 | B2 * | 12/2012 | Rawlinson | B60N 2/012 180/68.5 |
| 8,403,090 | B2 * | 3/2013 | Fujiwara | H01M 2/1077 180/68.5 |
| 8,479,858 | B2 * | 7/2013 | Kodaira | B60K 1/04 180/68.5 |
| 8,540,282 | B2 * | 9/2013 | Yoda | B60K 1/04 280/784 |
| 8,608,230 | B2 * | 12/2013 | Young | B60K 1/04 296/187.02 |
| 8,708,402 | B2 * | 4/2014 | Saeki | B60K 1/04 180/68.5 |
| 8,936,125 | B2 * | 1/2015 | Nakamori | B60K 1/04 180/68.5 |
| 8,939,246 | B2 * | 1/2015 | Yamaguchi | B60K 1/04 180/68.5 |
| 9,022,152 | B2 * | 5/2015 | Imamura | B62D 21/157 180/68.5 |
| 9,027,684 | B2 * | 5/2015 | Araki | B60K 1/04 180/311 |
| 9,038,757 | B2 * | 5/2015 | Ogushi | B60K 1/04 180/68.5 |
| 9,056,631 | B2 * | 6/2015 | Nakamori | B60K 1/04 |
| 9,227,582 | B2 * | 1/2016 | Katayama | B60K 1/04 |
| 9,517,687 | B2 * | 12/2016 | Nakajima | B60K 1/04 |
| 9,758,028 | B2 * | 9/2017 | Ikeda | B60K 1/04 |
| 9,796,424 | B2 * | 10/2017 | Sakaguchi | B60K 1/04 |
| 9,809,100 | B2 * | 11/2017 | Kamimura | B62D 25/2036 |
| 9,809,101 | B2 * | 11/2017 | Ikeda | B62D 29/001 |
| 9,821,852 | B2 * | 11/2017 | Akhlaque-e-rasul | B60K 1/04 |
| 9,956,859 | B2 * | 5/2018 | Ikeda | B60K 1/04 |
| 9,987,913 | B2 * | 6/2018 | Hara | B60K 1/04 |
| 10,207,573 | B2 * | 2/2019 | Hara | B60K 1/04 |
| 10,259,506 | B2 * | 4/2019 | Ayukawa | B62D 25/2036 |
| 2015/0255764 | A1 * | 9/2015 | Loo | H01M 2/1083 429/149 |
| 2015/0357606 | A1 * | 12/2015 | Nishimura | H01M 2/024 429/176 |

* cited by examiner

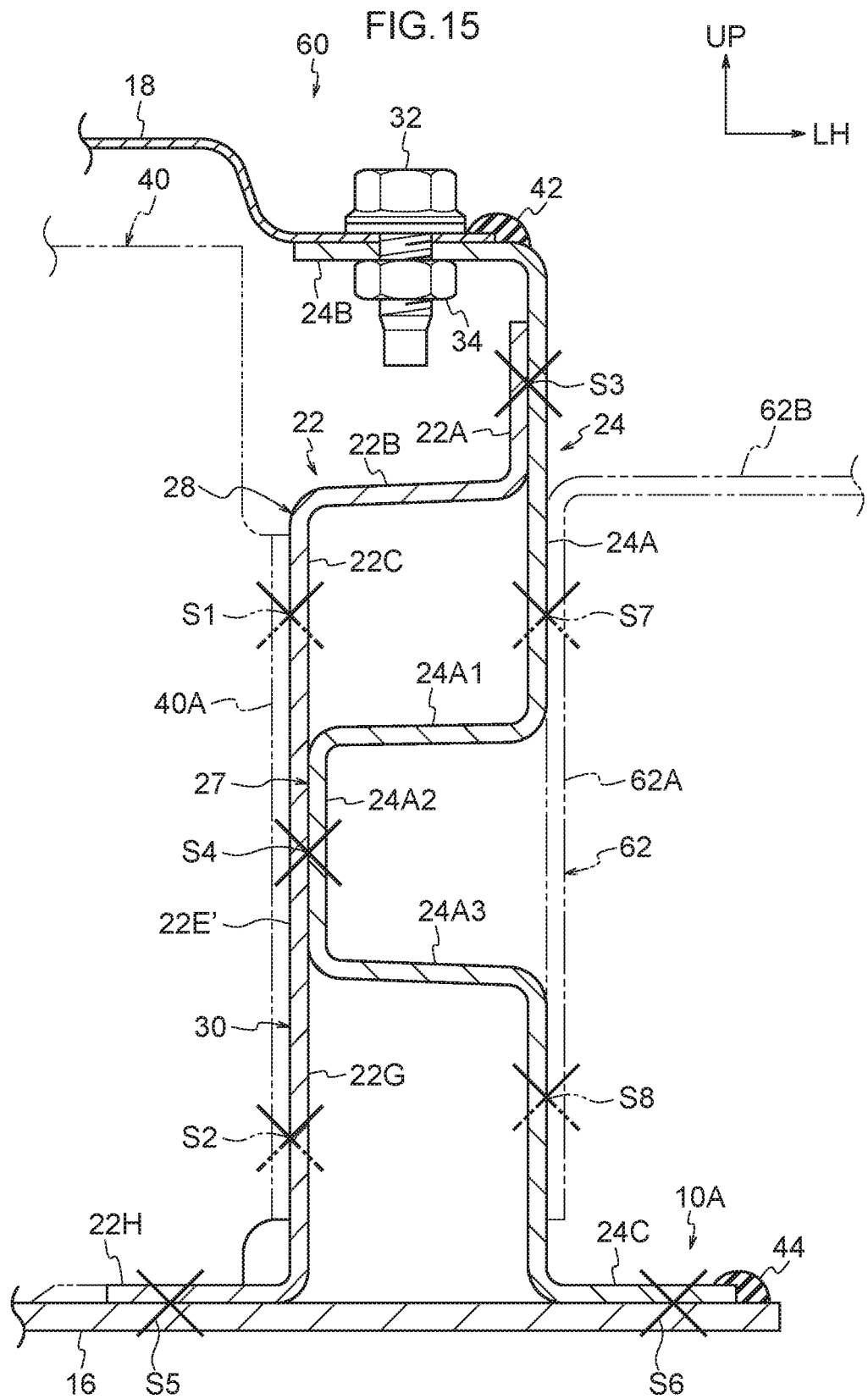

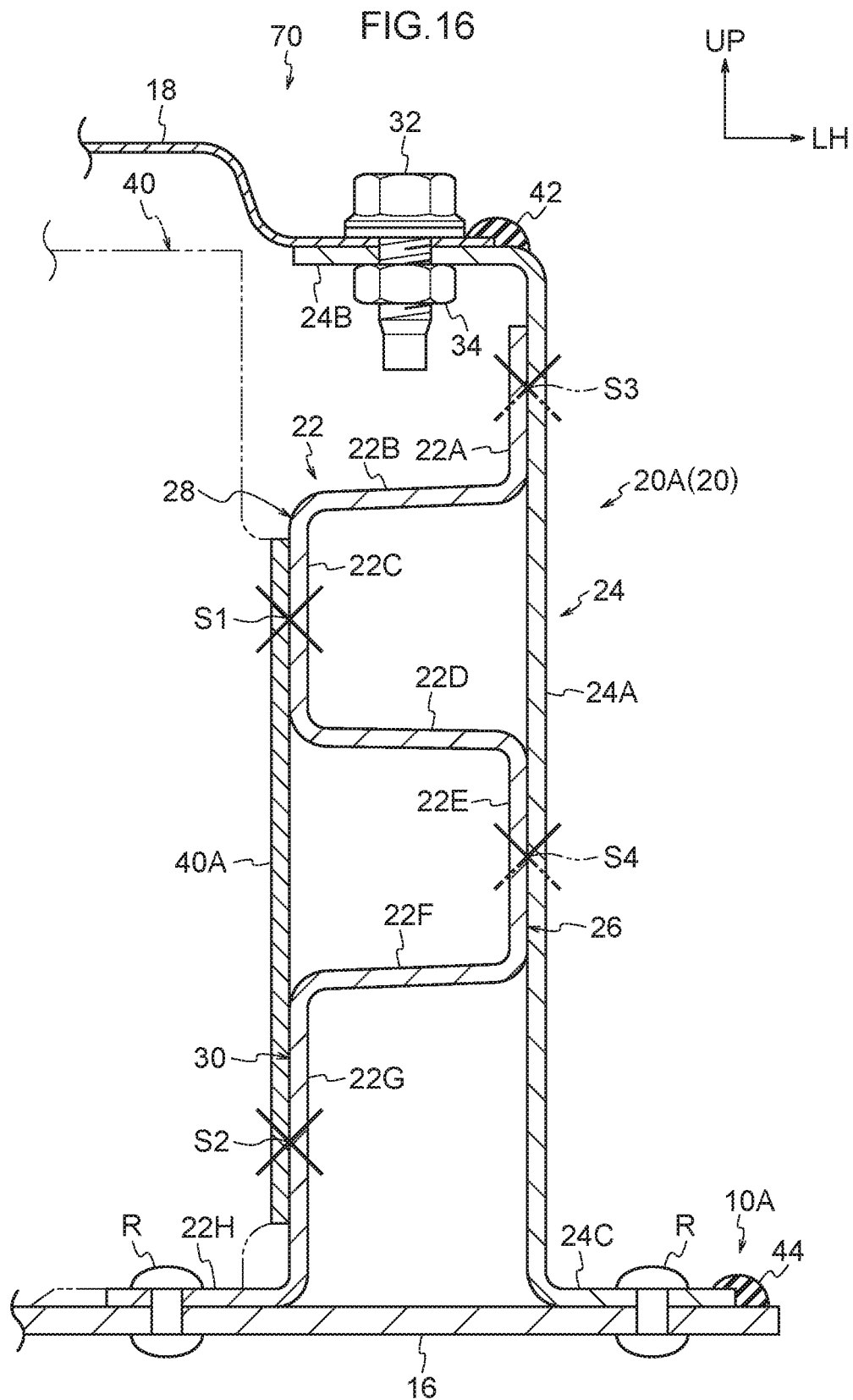

BATTERY CASE FOR VEHICLE AND METHOD OF MANUFACTURING OF BATTERY CASE

CROSS-REFERENCE TO RELATED APPLICATION

This application is based on and claims priority under 35 USC 119 from Japanese Patent Application No. 2017-222018 filed on Nov. 17, 2017, the disclosure of which is incorporated by reference herein.

BACKGROUND

Technical Field

The present disclosure relates to a battery case for a vehicle that houses a battery and is installed beneath the floor of a vehicle, and to a method of manufacturing the battery case for a vehicle.

Related Art

The battery pack for an electric vehicle that is disclosed in Japanese Patent Application Laid-Open (JP-A) No. 2015-170452 has a battery case that is installed beneath the floor of a vehicle. This battery case has a tray that is box-shaped and houses a battery, an outer frame that is disposed at the outer side of the tray, and plural inner frames and cross beams that are disposed at the inner side of the tray. These tray, outer frame, inner frames and cross beams are all formed of steel plates. The inner frames and the cross beams respectively are joined by spot welding in states of being superposed in three layers together with the tray and the outer frame. The outer frame, together with the tray, forms a side wall that has a closed cross-sectional shape. The side wall is supported from the inner side of the tray by the inner frames and the cross beams (both are supporting members). Due thereto, the strength of the battery case with respect to load from the vehicle transverse direction outer side is increased. In this battery case, openings (work holes) through which a gun for spot welding is inserted are formed in the outer frame.

In the above-described related art, the following disadvantages arise due to openings being formed in the outer frame. Namely, additional processes for forming the openings are needed, and the strength of the outer frame at the portions where the openings are formed decreases. Further, members for closing-off the openings are needed in order to prevent water and the like from penetrating into the outer frame. For the above reasons, problems such as the manufacturing cost increasing and the weight increasing and the like arise, and therefore, there is room for improvement.

Further, in the above-described related art, if the side wall, which has a closed cross-sectional shape and is formed by the outer frame and the tray, is crushed (the cross-section thereof collapses) due to load from the vehicle transverse direction outer side (the side opposite the cross beams), it is difficult for this load to be transmitted to the cross beams. As a result, the amount of deformation of the tray is large, and there is the possibility that the battery within the tray will be damaged. Further, in the above-described related art, the side wall bendingly deforming in front of and at the rear of a cross beam due to load from the vehicle transverse direction outer side is suppressed by the inner frames that are disposed within the tray. Therefore, the space for accommodating the battery is reduced by the space for the provision of the inner frames. For the above reasons, in the above-described related art, there is room for improvement also from the standpoint of efficiently suppressing the above-described deformation of the side wall.

SUMMARY

An aspect of the present disclosure is a battery case for a vehicle that houses a battery. The battery case includes: a bottom plate, a side wall, and supporting members that are joined to the bottom plate and that support the side wall from a case inner side, wherein the battery case is installed beneath a floor of a vehicle, the side wall has an inner panel to which the supporting members are joined by spot welding, and an outer panel that faces the inner panel from a side that is opposite from the supporting members, upper portions of the inner panel and the outer panel are joined together by spot welding, and lower end portions of the inner panel and the outer panel are joined to or made integral with the bottom plate, at a vertical direction intermediate portion of one of the inner panel or the outer panel, there is formed a bulging portion which bulges out toward another of the inner panel or the outer panel and is joined to the other of the inner panel or the outer panel by spot welding, closed cross-section portions are formed at the side wall at both an upper side and a lower side of the bulging portion, respectively, and weld points of the spot welding that join the inner panel and the outer panel are disposed at positions that do not overlap with the supporting members as seen from a direction in which the inner panel and the outer panel face one another.

BRIEF DESCRIPTION OF THE DRAWINGS

FIG. 15 is a cross-sectional view showing a partial structure of a battery case for a vehicle relating to a third embodiment.

FIG. 16 is a cross-sectional view showing a partial structure of a battery case for a vehicle relating to a fourth embodiment.

DETAILED DESCRIPTION

First Embodiment

Figure 1:
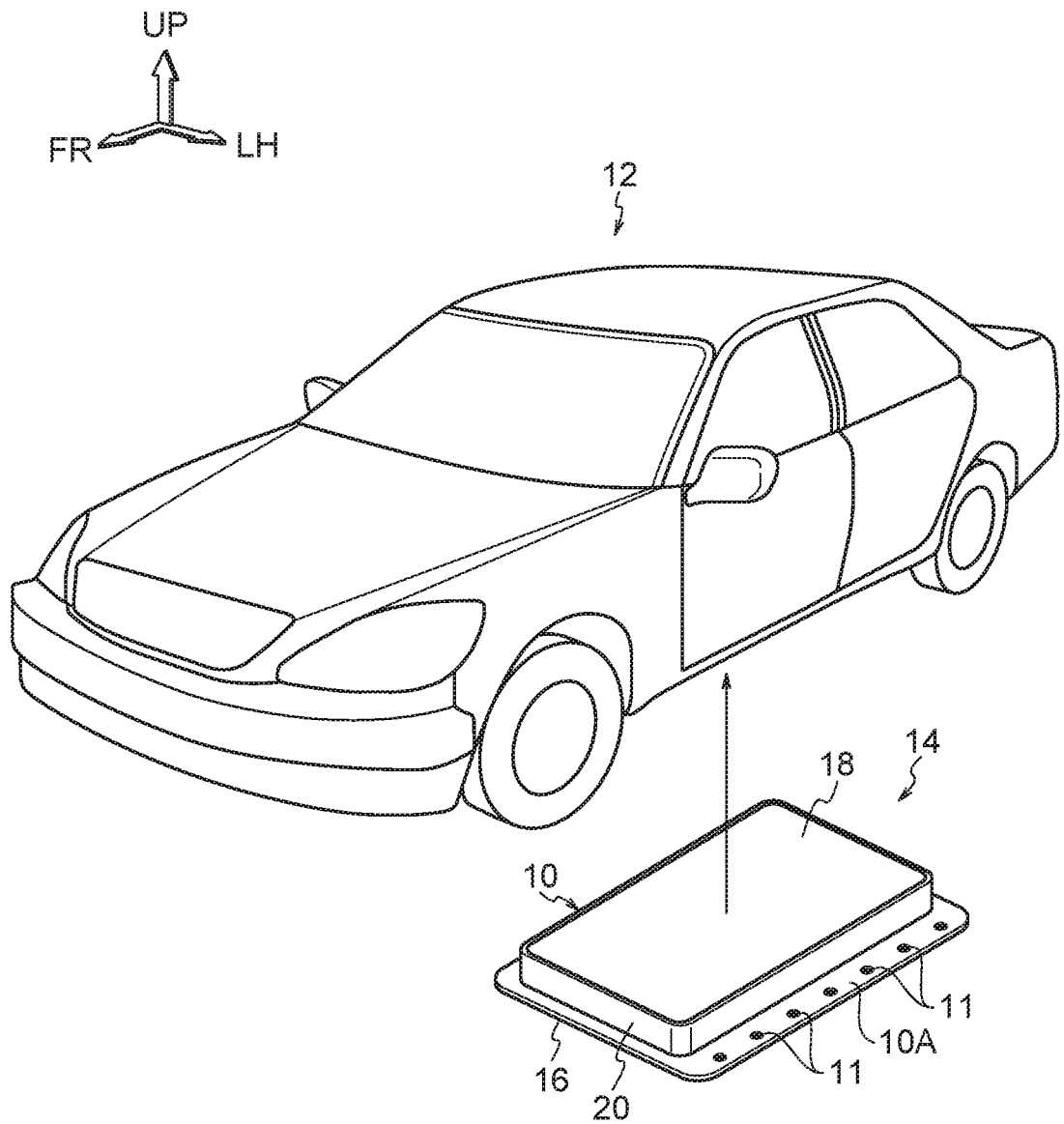
FIG. 1 is a perspective view showing a state in which a battery pack for a vehicle, which is structured to include a battery case for a vehicle relating to a first embodiment, is removed from a vehicle.

A battery case 10 for a vehicle relating to a first embodiment of the present disclosure (hereinafter simply called "battery case 10") and a method of manufacturing thereof are described hereinafter by using FIG. 1 through FIG. 8. Note that arrow FR, arrow UP and arrow LH that are shown appropriately in the respective drawings indicate the forward direction (the advancing direction), the upward direction and the leftward direction, respectively, of an electric automobile (vehicle) 12 at which the battery case 10 for a vehicle is installed beneath the floor. Hereinafter, when explanation is given by merely using longitudinal, left-right and vertical directions, they refer to the longitudinal of the vehicle longitudinal direction, the left and right of the vehicle left-right direction (the vehicle transverse direction), and the vertical of the vehicle vertical direction, unless otherwise indicated. Further, in the respective drawings, there are cases in which some of the reference numerals are omitted in order to make the drawings easy to understand.

As shown in FIG. 1, the electric automobile 12 relating to the present embodiment has a battery pack 14 for a vehicle (hereinafter simply called "battery pack 14") that is installed beneath the floor of the vehicle cabin. This battery back 14 is for supplying electric power to electric equipment for causing the electric automobile 12 to travel, an air conditioner of the electric automobile 12, and the like, and has the battery case 10 and incorporated parts such as a battery or the like that are accommodated at the interior of the battery case 10. The battery is structured by plural battery modules. Each of the battery modules is structured by, for example, plural square-type storage batteries being made into a module. The overall structure of the battery case 10 will be described first, and thereafter, the structure of main portions of the present embodiment, and the method of manufacturing the battery case 10, will be described successively.

Overall Structure of Battery Case

Figure 2:
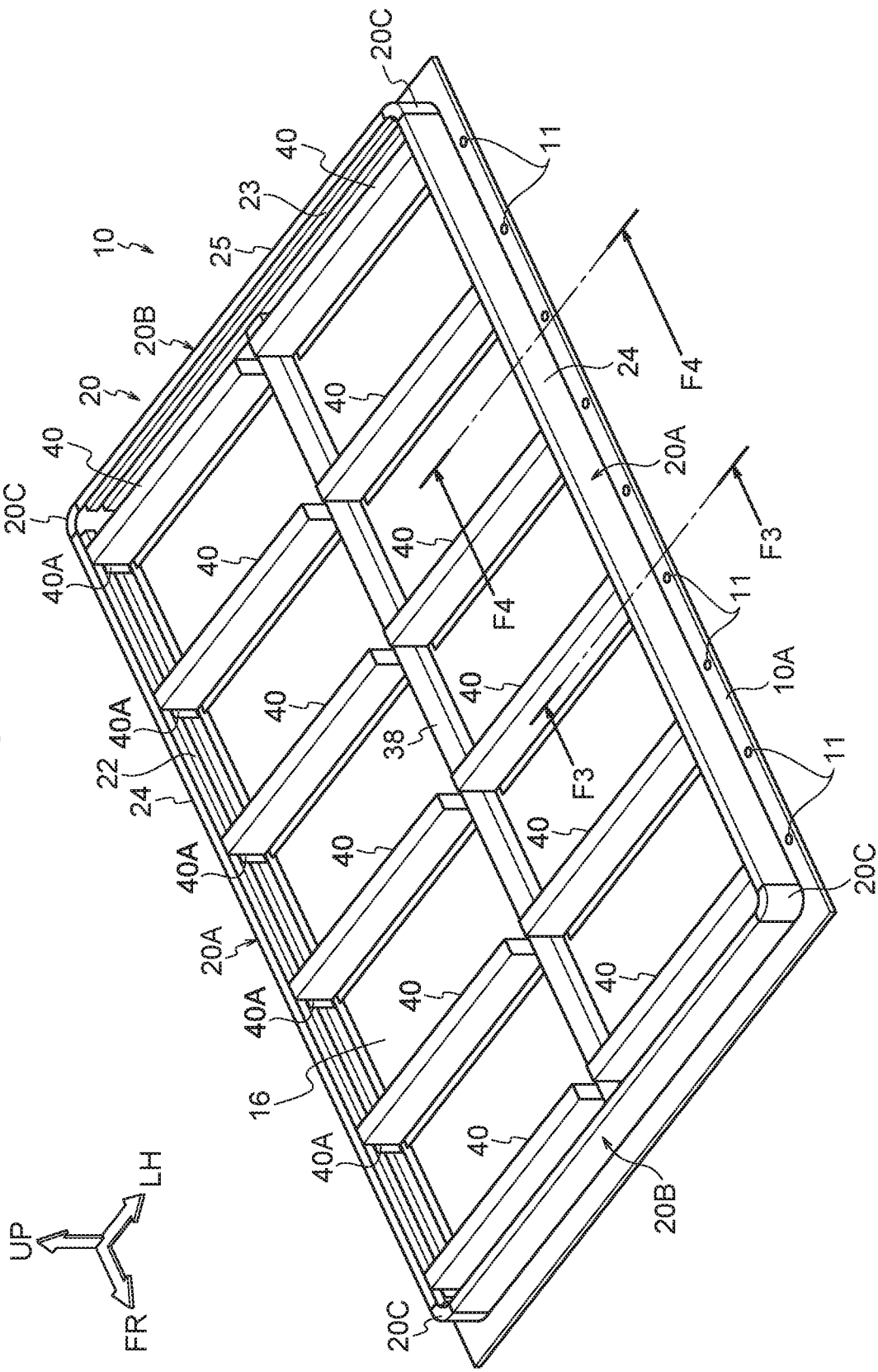
FIG. 2 is a perspective view showing a state in which an upper lid has been removed from the battery case for a vehicle relating to the first embodiment.
Figure 3:
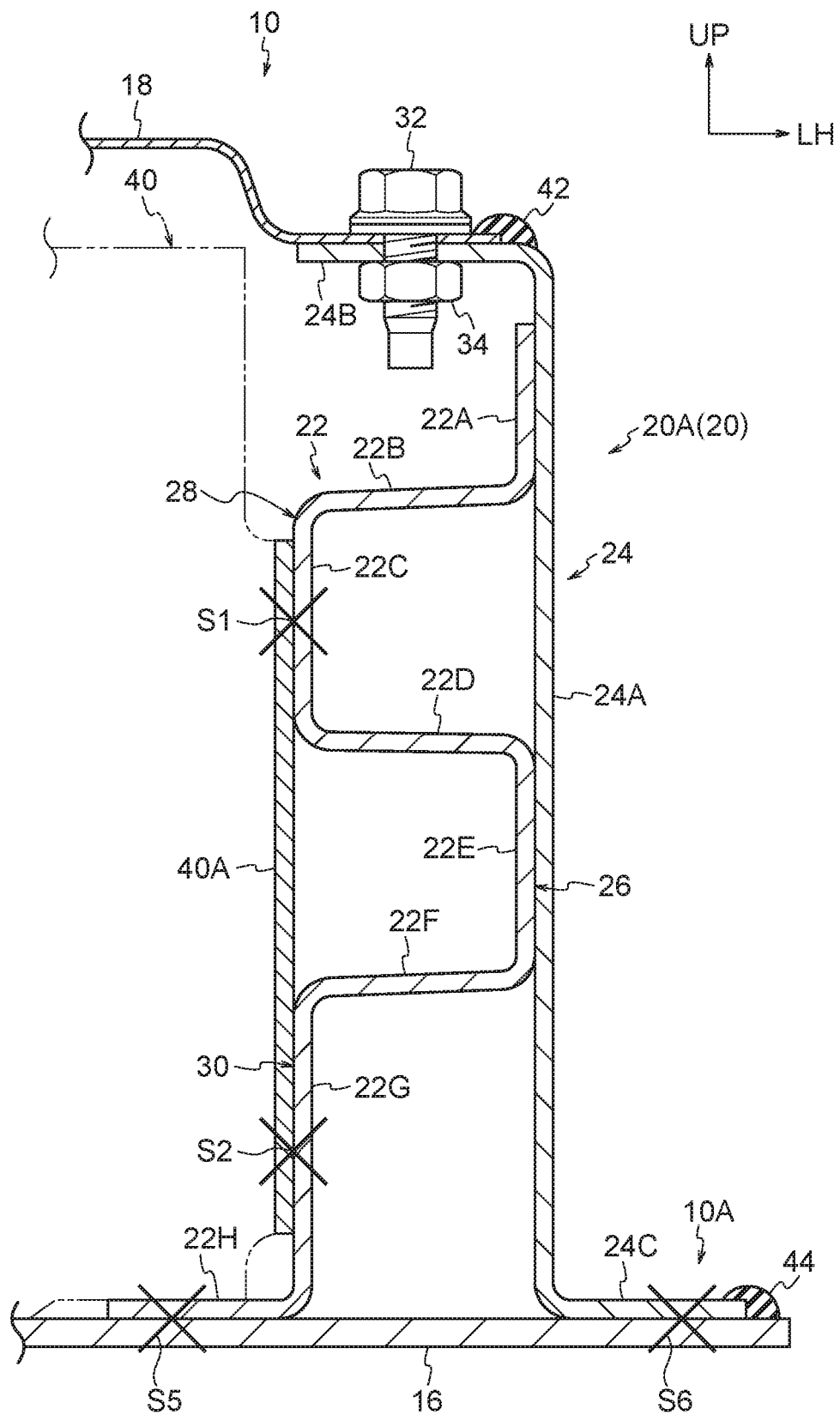
FIG. 3 is a cross-sectional view showing, in an enlarged manner, the cross-section cut along line F3-F3 of FIG. 2.
Figure 4:
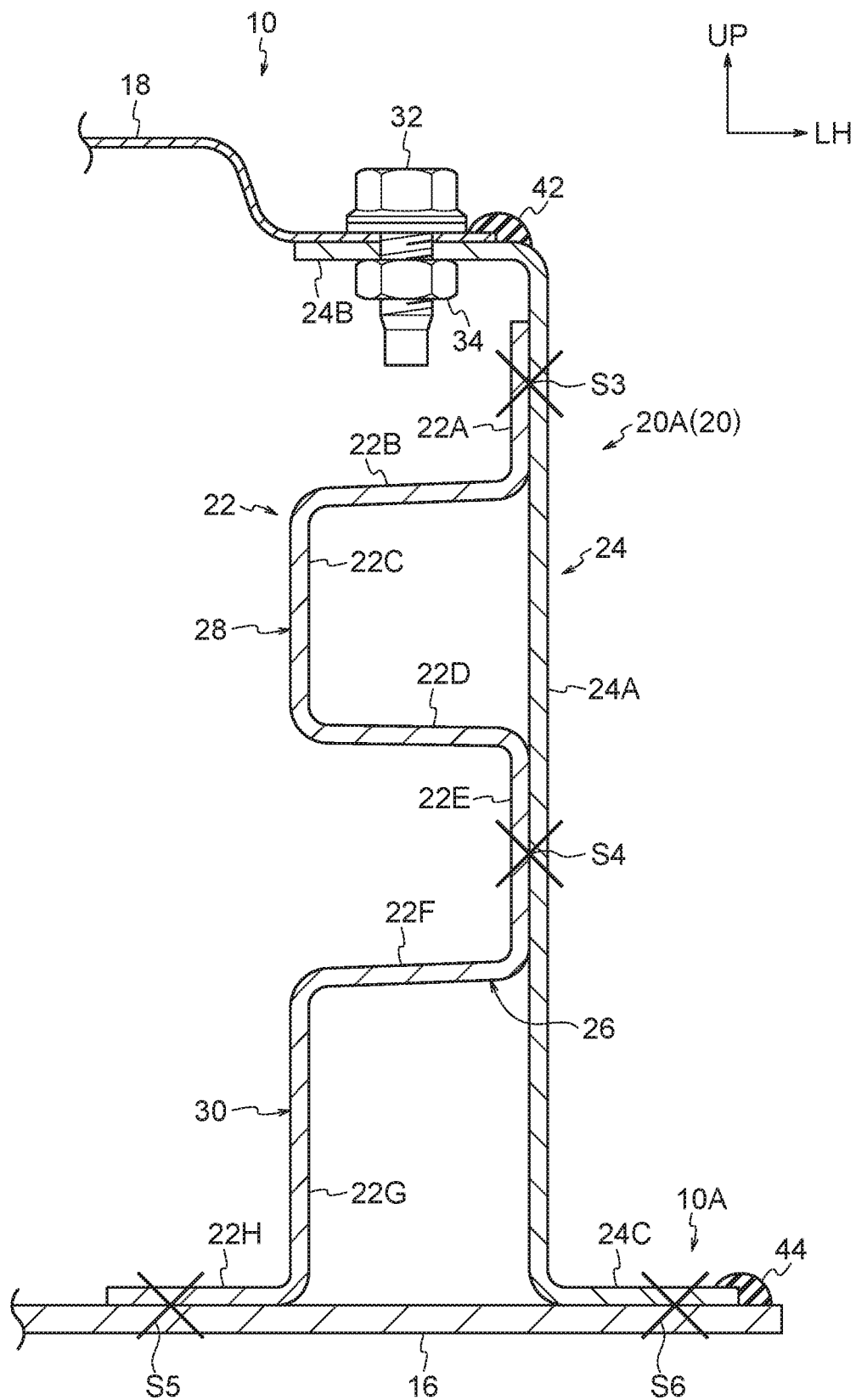
FIG. 4 is a cross-sectional view showing, in an enlarged manner, the cross-section cut along line F4-F4 of FIG. 2.

The battery case 10 is shaped as a box whose length direction is the vehicle longitudinal direction and that is flat in the vehicle vertical direction, and is fixed to the vehicle body of the electric automobile 12 by fastening by bolts. As shown in FIG. 1 through FIG. 4, the battery case 10 has a bottom plate 16 that forms the lower surface of the battery case 10, an upper lid 18 that forms the upper surface of the battery case 10, a side wall (peripheral wall) 20 that forms the outer peripheral surface of the battery case 10, a center beam 38 (see FIG. 2) that is disposed at the vehicle transverse direction center of the battery case 10 interior, and plural (here, 12) cross beams 40 that support the side wall 20 from the case inner side. The cross beams 40 correspond to the "supporting members" of the present disclosure. Note that 42 and 44 that are shown in FIG. 3 and FIG. 4 are sealers that block water at the mating portion of the final end portion of the upper lid 18 and the side wall 20, and the mating portion of the side wall 20 and the bottom plate 16.

The bottom plate 16, the upper lid 18, the side wall 20, the center beam 38 and the cross beams 40 are all formed by steel plates. The bottom plate 16, the side wall 20 and the cross beams 40 are joined together by spot welding. The center beam 38 is joined to (united with) the bottom plate 16 by spot welding. Further, the upper lid 18 is joined to (united with) the side wall 20 by fastening by bolts. Note that there may be a structure in which all of or some of the above-described respective members are formed of a light metal such as aluminum or the like or of an alloy thereof.

The bottom plate 16 and the upper lid 18 are formed by steel plates being press-molded into the shapes of plates that are elongated and rectangular, and are disposed with the length directions thereof being the vehicle longitudinal direction and the plate thickness directions thereof being the vehicle vertical direction. The side wall 20 is shaped as a frame that is elongated and rectangular and whose long side runs along the vehicle longitudinal direction as seen from the vehicle vertical direction. The side wall 20 is structured by a pair of left and right rectilinear portions 20A, a pair of front and rear rectilinear portions 20B, and four corner portions 20C that connect these rectilinear portions 20A, 20B. The left and right rectilinear portions 20A extend in the vehicle longitudinal direction, and the front and rear rectilinear portions 20B extend in the vehicle transverse direction. The structure of this side wall 20 is described in detail later.

The center beam 38 is formed in an elongated shape due to a steel plate being roll-formed or press-molded, and is disposed at the center between the left and right rectilinear portions 20A with the length direction thereof being the vehicle longitudinal direction. The cross-section seen from the vehicle longitudinal direction of the center beam 38 is hat-shaped, and a pair of left and right lower flange portions that are formed at the lower end portion are joined to the top surface of the bottom plate 16 by spot welding.

The plural cross beams 40 are formed in elongated shapes due to steel plates being roll-formed or press-molded, and are disposed between the left rectilinear portion 20A and the center beam 38, and between the right rectilinear portion 20A and the center beam 38, with the length directions thereof being the vehicle transverse direction. In detail, plural (here, six) pairs of the cross beams 40, which are disposed so as to be lined-up in the vehicle transverse direction at the both sides of the center beam 38, are disposed at intervals in the vehicle longitudinal direction. The height dimension of these cross beams 40 is set to be higher than the height dimension of the center beam 38.

The cross-section seen from the vehicle transverse direction of each of the cross beams 40 is hat-shaped, and a pair of front and rear lower flange portions (see FIG. 2) that are formed at the lower end portion of the cross beam 40 are joined by spot welding to the top surface of the bottom plate 16. Further, a pair of front and rear lateral flange portions 40A that project-out toward the vehicle longitudinal direction both sides are formed at the vehicle transverse direction end portions of each of the cross beams 40. The front and rear lateral flange portions 40A are joined by spot welding to the left and right rectilinear portions 20A.

Main Portions of Present Embodiment

Main portions of the present embodiment are described next by using FIG. 2 through FIG. 4. At the battery case 10 relating to the present embodiment, the left and right rectilinear portions 20A of the above-described side wall 20 are supported from the case inner side by the plural cross beams 40. Each of the left and right rectilinear portions 20A is structured by an inner panel 22 to which the lateral flange portions 40A of the cross beams 40 are joined by spot welding, and an outer panel 24 that is disposed at the side of the inner panel 22 which side is opposite the side at which the cross beams 40 are located (i.e., the outer panel 24 is disposed at the vehicle transverse direction outer side of the inner panel 22).

Note that, because the battery case 10 is structured so as to be symmetrical to the left and right, the structure of the left side portion of the battery case 10 is described hereinafter, and description of the structure of the right side portion is omitted. Further, in the following description, there are cases in which the rectilinear portion 20A at the left is simply called the "rectilinear portion 20A", and the plural cross beams 40 are simply called the "cross beams 40", and the front and rear lateral flange portions 40A of the cross beam 40 are simply called the "lateral flange portions 40A".

The inner panel 22 and the outer panel 24 are formed in elongated shapes by steel plates being roll-hemmed, and are disposed with the length directions thereof being the vehicle longitudinal direction and the thickness directions thereof being the vehicle transverse direction. The upper portions of the inner panel 22 and the outer panel 24 are joined together by spot welding, and the lower end portions are joined to the bottom plate 16 by spot welding. A bulging portion 26, which bulges-out toward the outer panel 24 side and is joined to the outer panel 24 by spot welding, is formed at the vertical direction intermediate portion of the inner panel 22. Closed cross-section portions 28, 30 are formed at the upper and lower both sides, respectively, of the bulging portion 26 at the rectilinear portion 20A. The weld points of the aforementioned spot welding are set at multiple places that are lined-up in the vehicle longitudinal direction. Further, the multiple weld points (refer to weld points S3, S4 in FIG. 4) of the spot welding that joins the inner panel 22 and the outer panel 24 are disposed at positions that do not overlap the cross beams 40 as seen from the direction in which the inner panel 22 and the outer panel 24 face one another (the vehicle transverse direction). Details thereof are described hereinafter.

As shown in FIG. 3 and FIG. 4, the cross-section seen from the vehicle longitudinal direction (the length direction) of the outer panel 4 is bent in the shape of a crank, and is a cross-section of the same shape in the length direction. The outer panel 24 is structured by a vertical wall portion 24A that extends in the vehicle vertical direction as seen in the vehicle longitudinal direction, an upper flange portion 24B that extends toward the vehicle transverse direction inner side from the upper end portion of the vertical wall portion 24A, and a lower flange portion 24C that extends toward the vehicle transverse direction outer side from the lower end portion of the vertical wall portion 24A. The height dimension of the outer panel 24 is set to be equal to the height dimension of the cross beams 40.

A weld nut 34, with which is screwed-together a bolt 32 for fastening the upper lid 18 to the upper flange portion 24B, is fixed to the bottom surface of the upper flange portion 24B. The lower flange portion 24C is superposed on the top surface of the vehicle transverse direction end portion of the bottom plate 16, and is joined to the bottom plate 16 in the vehicle vertical direction by spot welding (refer to weld point S6 in FIG. 3 and FIG. 4). Due thereto, a mounting flange portion 10A that extends toward the vehicle transverse direction outer side is formed at the lower end of the vehicle transverse direction end portion of the battery case 10. Multiple through-holes 11 are formed in the mounting flange portion 10A so as to be lined-up in the vehicle longitudinal direction. The battery case 10 is fixed to the vehicle body of the electric automobile 12 by using bolts that are inserted through these through-holes 11.

As shown in FIG. 3 and FIG. 4, the cross-section seen from the vehicle longitudinal direction of the inner panel 22 is bent in a rectangular wave shape, and is a cross-section of the same shape in the length direction. The inner panel 22 is structured by an upper side outer joining portion 22A that extends in the vehicle vertical direction as seen in the vehicle longitudinal direction, an upper side lateral wall portion 22B that extends toward the vehicle transverse direction inner side from the lower end portion of the upper side outer joining portion 22A, an upper side beam joining portion 22C that extends toward the vehicle lower side from the vehicle transverse direction inner side end portion of the upper side lateral wall portion 22B, an intermediate lateral wall portion 22D that extends toward the vehicle transverse direction outer side from h lower end portion of the upper side beam joining portion 22C, a lower side outer joining portion 22E that extends toward the vehicle lower side from the vehicle transverse direction outer side end portion of the intermediate lateral wall portion 22D, a lower side lateral wall portion 22F that extends toward the vehicle transverse direction inner side from the lower end portion of the lower side outer joining portion 22E, a lower side beam joining portion 22G that extends toward the vehicle lower side from the vehicle transverse direction inner side end portion of the lower side lateral wall portion 22F, and a lower flange portion 22H that extends toward the vehicle transverse direction inner side from the lower end portion of the lower side beam joining portion 22G. The height dimension of the inner panel is set to be slightly lower than the height dimensions of the outer panel 24 and the cross beam 40.

The upper side outer joining portion 22A and the lower side outer joining portion 22E are superposed on the vertical wall portion 24A of the outer panel 24 from the vehicle transverse direction inner side (the case inner side), and are joined to the vertical wall portion 24A in the vehicle transverse direction by spot welding (refer to the weld points S3, S4 in FIG. 4). Due thereto, the inner panel 22 and the outer panel 24 are joined together at the upper portion and the vertical direction intermediate portion. The upper side beam joining portion 22C and the lower side beam joining portion 22G are superposed on the lateral flange portions 40A of the cross beam 40 from the vehicle transverse direction outer side (the case outer side), and are joined to the lateral flange portions 40A in the vehicle transverse direction by spot welding (refer to weld points S1, S2 in FIG. 3). The lower flange portion 22H is superposed on the top surface of the bottom plate 16, and is joined to the bottom plate 16 in the vehicle vertical direction by spot welding (refer to weld point S5 in FIG. 3 and FIG. 4).

At the rectilinear portion 20A that has the above-described structure, the upper side lateral wall portion 22B, the intermediate lateral wall portion 22D and the lower side lateral wall portion 22F extend substantially along the vehicle horizontal direction. Further, the above-described bulging portion 26 is structured by the intermediate lateral wall portion 22D, the lower side outer joining portion 22E and the lower side lateral wall portion 22F. This bulging portion 26 is formed in a substantial U-shape in cross-section whose vehicle transverse direction inner side is open as seen from the vehicle longitudinal direction. The upper and lower closed cross-section portions 28, 30 are formed at the upper and lower both sides of the bulging portion 26. The closed cross-section portion 28 at the upper side is structured by the upper side lateral wall portion 22B, the upper side beam joining portion 22C and the intermediate lateral wall portion 22D of the inner panel 22, and the vertical wall portion 24A of the outer panel 24. The closed cross-section portion 30 at the lower side is structured by the lower side lateral wall portion 22F and the lower side beam joining portion 22G of the inner panel 22, and the vertical wall portion 24A of the outer panel 24, and the bottom plate 16. The upper and lower closed cross-section portions 28, 30 are connected vertically by the lateral flange portions 40A.

At this rectilinear portion 20A, the weld points S3, S4 of spot welding that join the inner panel 22 and the outer panel 24 are disposed at positions that do not overlap the cross beams 40 as seen from the vehicle transverse direction, i.e., at positions that are offset from the cross beams 40 in the vehicle longitudinal direction (the length direction of the rectilinear portion 20A). In detail, at the time of joining the outer panel 24 by spot welding to the inner panel 22 to which the cross beams 40 have been joined, the aforementioned weld points S3, S4 are offset in the vehicle longitudinal direction with respect to the cross beams 40 to the extent that the gun for spot welding does not interfere with the cross beams 40. Namely, there is a structure in which the aforementioned weld points S3, S4 do not exist at positions that overlap the cross beams 40 as seen from the vehicle transverse direction.

At the battery case 10 relating to the present embodiment, in the same way as the rectilinear portions 20A at the left and the right, the rectilinear portions 20B at the front and the rear of the side wall 20 are formed by two panels (refer to inner panel 23 and outer panel 25 that are shown in FIG. 1) being joined by spot welding. The inner panel 23 and the outer panel 25 have structures that are basically similar to those of the inner panel 22 and the outer panel 24, except that the inner panel 23 and the outer panel 25 are formed such that the length directions thereof are the vehicle transverse direction and so as to be slightly shorter than the rectilinear portions 20A at the left and the right. Further, the four corner portions 20C of the side wall 20 are formed by, for example, steel plates being press-molded in circular arc shapes, and are joined to the left and right rectilinear portions 20A and to the front and rear rectilinear portions 20B (e.g., the above-described outer panels 24, 25) by means such as welding or the like.

The present embodiment is structured such that the front and rear rectilinear portions 20B are not joined to the center beam 38, but is not limited to this. Namely, there may be a structure in which pairs of left and right flange portions are formed at the vehicle longitudinal direction end portions of the center beam 38, and these flanges and the respective inner panels 23 of the front and rear rectilinear portions 20B are joined by spot welding. In this case, the structure of joining the center beam 38 and the inner panel 23 and the outer panel 25 is similar to the structure of joining the inner panel 22 and the outer panel 24 and the cross beams 40. Further, in this case, the center beam 38 is a supporting member that supports the front and rear rectilinear portions 20B from the case inner side.

Method of Manufacturing Battery Case

Figure 5:
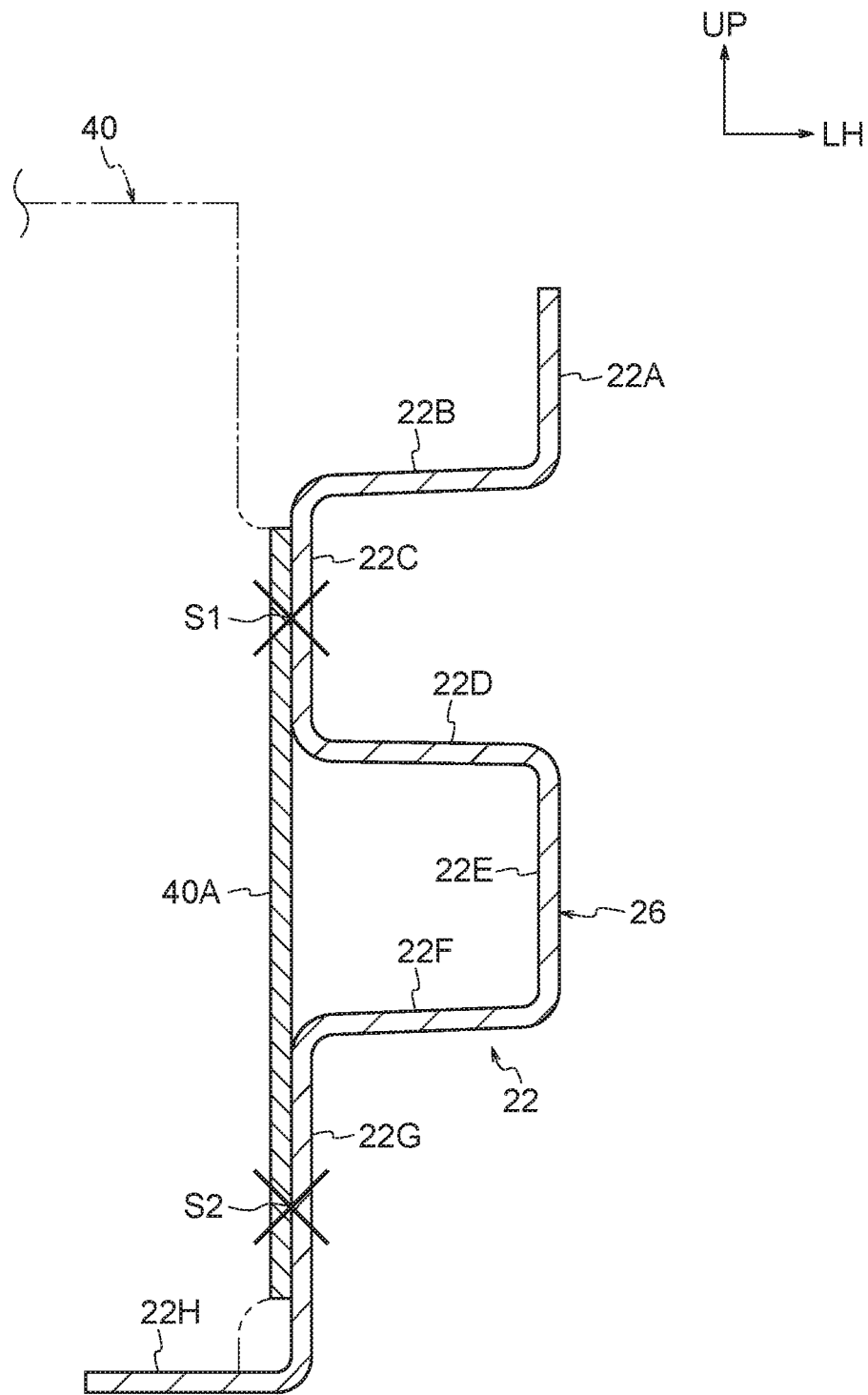
FIG. 5 is a cross-sectional view showing a first step of a method of manufacturing the battery case for a vehicle relating to the first embodiment.
Figure 6:
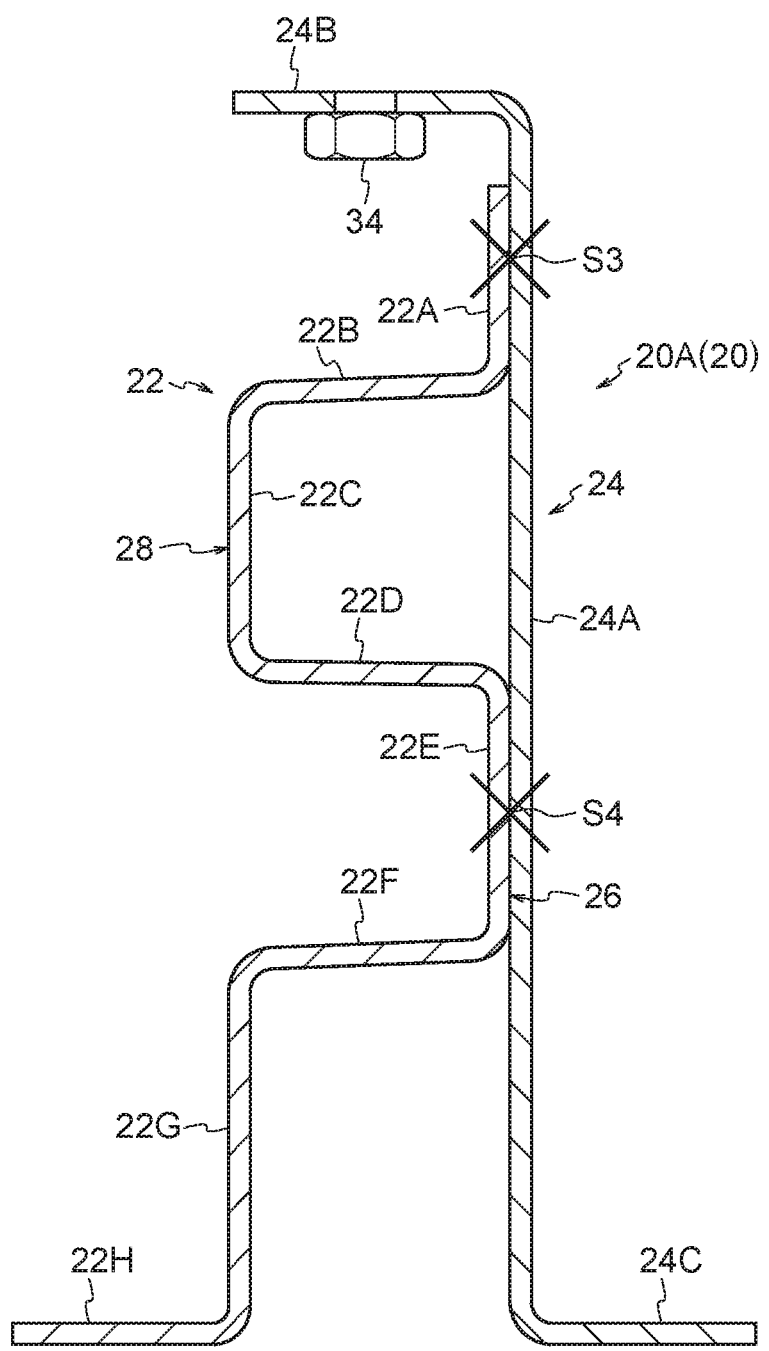
FIG. 6 is a cross-sectional view showing a second step of the manufacturing method.
Figure 7:
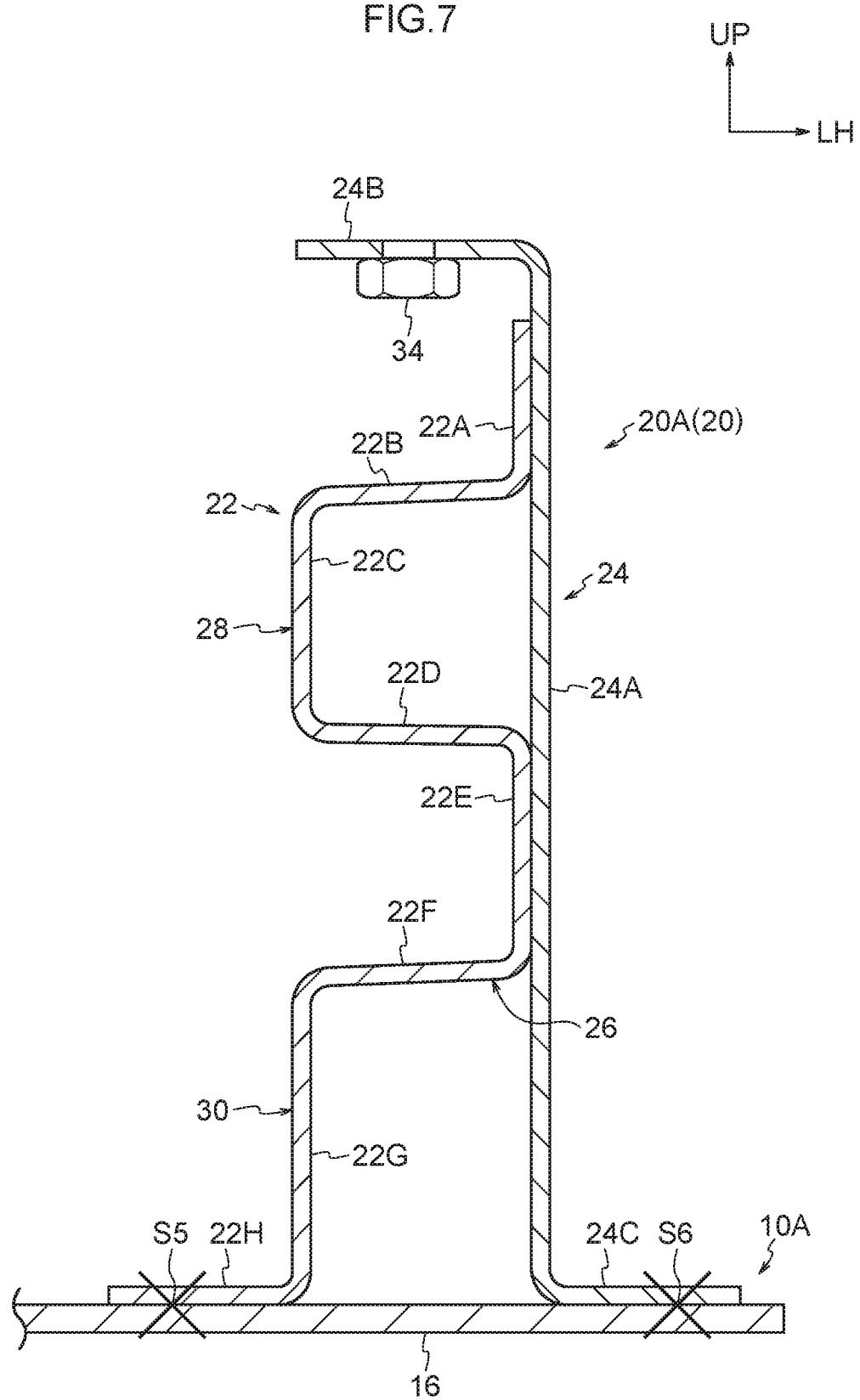
FIG. 7 is a cross-sectional view showing a third step of the manufacturing method.
Figure 8:
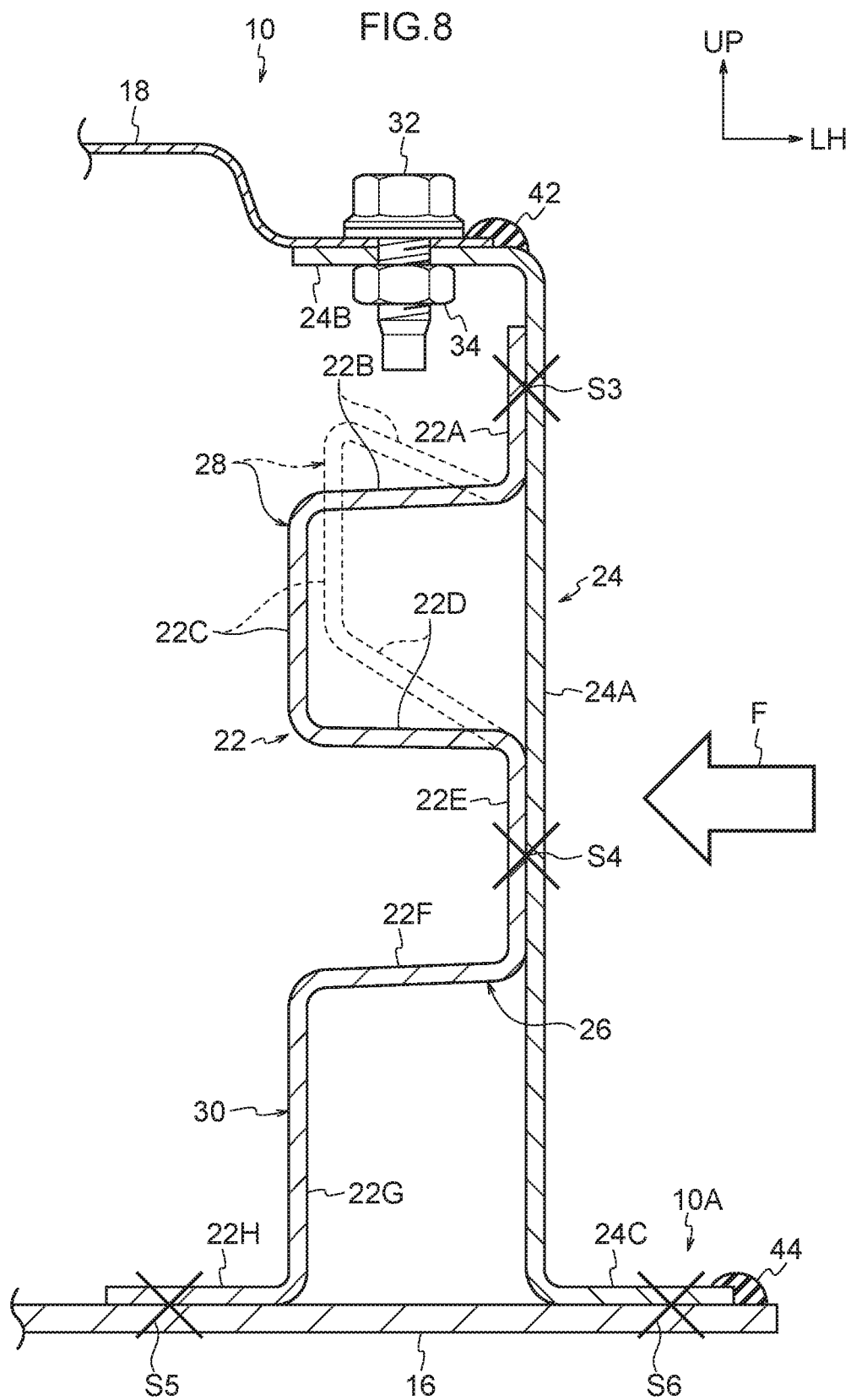
FIG. 8 is a cross-sectional view that corresponds to FIG. 4 and is for explaining an example of a mode of deformation at a side wall of the battery case for a vehicle relating to the first embodiment.

The method of manufacturing the above-described battery case 10 is described next by using FIG. 5 through FIG. 7. In this manufacturing method, first, in a first step, as shown in FIG. 5, the cross beams 40 and the inner panels 22 are joined by spot welding. Next, in a second step, as shown in FIG. 6, the outer panels 24 are placed on the inner panels 22 from the sides opposite the cross beams 40, and the inner panels 22 and the outer panels 24 are joined by spot welding. Next, in a third step, as shown in FIG. 7, the inner panels 22, the outer panels 24 and the cross beams 40 are placed on the bottom plate 16, and the inner panels 22, the outer panels 24 and the cross beams 40, and the bottom plate 16, are joined by spot welding. The bottom plate 16 and the left and right rectilinear portions 20A are thereby joined.

Further, in a step separate from the above-described steps, the aforementioned inner panels 23 and the outer panels 25 are joined, and the front and rear rectilinear portions 20B are manufactured. The manufactured front and rear rectilinear portions 20B are placed on the bottom plate 16 to which the left and right rectilinear portions 20A have been joined as described above, and are joined to the bottom plate 16 by spot welding. Next, the four corner portions 20C are joined to the left and right rectilinear portions 20A and the front and rear rectilinear portions by means such as welding or the like. Due thereto, the side wall 20 that is joined to the bottom plate 16 is completed. Note that there may be a structure in which the four corner portions 20C are joined to the left and right rectilinear portions 20A or the front and rear rectilinear portions 20B, before the front and rear rectilinear portions 20B are joined to the bottom plate 16.

Next, the incorporated parts such as the battery and the like are mounted to the inner side of the side wall 20 (the case inner side), and the upper lid 18 is placed on the side wall 20, and the upper lid 18 is fixed to the side wall 20 by fastening by bolts. Thereafter, the sealers 42, 44 for water blocking (refer to FIG. 3 and FIG. 4) are applied to the mating portion of the final end portion of the upper lid 18 and the side wall 20, and to the mating portion of the side wall 20 and the bottom plate 16. Due thereto, the battery case 10 that houses the battery, i.e., the battery pack 14, is completed.

Operation and Effects

Operation and effects of the present embodiment are described next.

The battery case 10 of the above-described structure has the bottom plate 16, the side wall 20, and the cross beams 40 that are joined to the bottom plate 16 and that support the side wall 20 from the case inner side. The side wall 20 has the inner panels 22 to which the cross beams 40 are joined by spot welding, and the outer panels 24 that face the inner panels 22 from the sides opposite the cross beams 40. The upper portions of the inner panels 22 and the outer panels 24 are joined together by spot welding, and the lower end portions are joined to the bottom plate 16 by spot welding. Further, the bulging portion 26, which bulges-out toward the outer panel 24 side and is joined to the outer panel 24 by spot welding, is formed at the vertical direction intermediate portion of the inner panel 22. The closed cross-section portions 28, 30 are formed at the upper and lower both sides of the bulging portion 26 at the side wall 20, respectively.

Here, the weld points S3, S4 of spot welding that join the inner panel 22 and the outer panel 24 are disposed at positions that do not overlap the cross beams 40 as seen in the direction in which the inner panel 22 and the outer panel 24 face one another (the vehicle transverse direction). Therefore, at the time when the side wall 20, which forms the closed cross-section portions 28, 30, and the cross beams 40, which support the side wall 20 from the case inner side, are joined by spot welding as described above, first, the cross beams 40 and the inner panel 22 are spot welded. Then, thereafter, it suffices to spot weld the inner panel 22 and the outer panel 24 at the above-described non-overlapping positions. Therefore, there is no need to form, in the side wall 20 (the outer panel 24 and the like), openings through which a gun for spot welding is inserted.

Moreover, the bulging portion 26, i.e., a portion of the side wall 20, that is provided at the inner panel 22 suppresses deformation of the side wall 20 (the rectilinear portion 20A) that is due to load (e.g., the load of a side collision, hereinafter simply called "load") from the vehicle transverse direction outer side (the side opposite the cross beams 40). Namely, because the bulging portion 26 has the intermediate lateral wall portion 22D and the lower side lateral wall portion 22F, it is easy for the aforementioned load to be transmitted to the cross beams 40 without the cross-section of the side wall 20 collapsing. Further, bending deformation of the side wall 20 between the cross beams 40 that are lined-up in the vehicle longitudinal direction is suppressed. Due thereto, deformation of the side wall 20 can be suppressed efficiently.

Further, in the present embodiment, the following effects are achieved because the bulging portion 26 is formed at the vertical direction intermediate portion of the inner panel 22. Namely, in a case in which a bulging portion that bulges-out toward the inner panel 22 side is formed at the vertical direction intermediate portion of the outer panel 24, a recess is formed in the surface of the outer panel 24 which surface is at the side opposite the inner panel 22 (i.e., is at the case outer side). Therefore, there is the possibility that water or foreign matter or the like will collect in this recess, but this can be avoided in the present embodiment.

Moreover, in the present embodiment, at the side wall 20, the closed cross-section portions 28, 30 that are formed at the upper and lower both sides of the bulging portion 26 respectively, are joined to the lateral flange portions 40A of the cross beams 40. Due thereto, because the upper and lower closed cross-section portions 28, 30 are connected via the lateral flange portions 40A (i.e., the cross beams 40), deformation of the side wall 20 due to load can be suppressed more efficiently.

Namely, in the present embodiment, the upper and lower closed cross-section portions 28, 30, which are surrounded by the inner panel 22 and the outer panel 24, are formed due to the inner panel 22 being made to have a wave-shaped cross-section. Provided that the cross-sectional shapes of these closed cross-section portions 28, 30 are maintained, the structure is strong with respect to bending, and further, load (external force) is transmitted to the cross beams 40 via the bulging portion 26. On the other hand, when the closed cross-section portion 28 deforms (so-called matchbox deformation) due to load F from the vehicle transverse direction outer side as shown by the dashed line in FIG. 8, the above-described performance is no longer exhibited.

With regard to this point, in the present embodiment, because the upper and lower closed cross-section portions 28, 30 are connected by the lateral flange portions 40A of the cross beams 40, matchbox deformation of the closed cross-section portion 28 can be suppressed without increasing the number of parts. Note that, in the present embodiment, the upper and lower closed cross-section portions 28, 30 are connected by the lateral flange portions 40A that extend vertically, but, even if the lateral flange portions 40A are divided vertically, the upper and lower lateral flange portions 40A that have been divided are connected to the main body portions of the cross beams 40, and therefore, the above-described matchbox deformation can be suppressed.

Further, in the present embodiment, the bottom plate 16, the inner panel 22, the outer panel 24 and the cross beams 40 are formed by steel plates. Therefore, the manufacturing cost can be decreased as compared with a case in which these members are formed of a light metal such as aluminum or the like or of an alloy thereof. Moreover, because the bottom plate 16 is joined to the inner panel 22, the outer panel 24 and the cross beams 40 by spot welding, the above-described respective members can be joined by only spot welding. Accordingly, manufacturing is easy.

Figure 9:
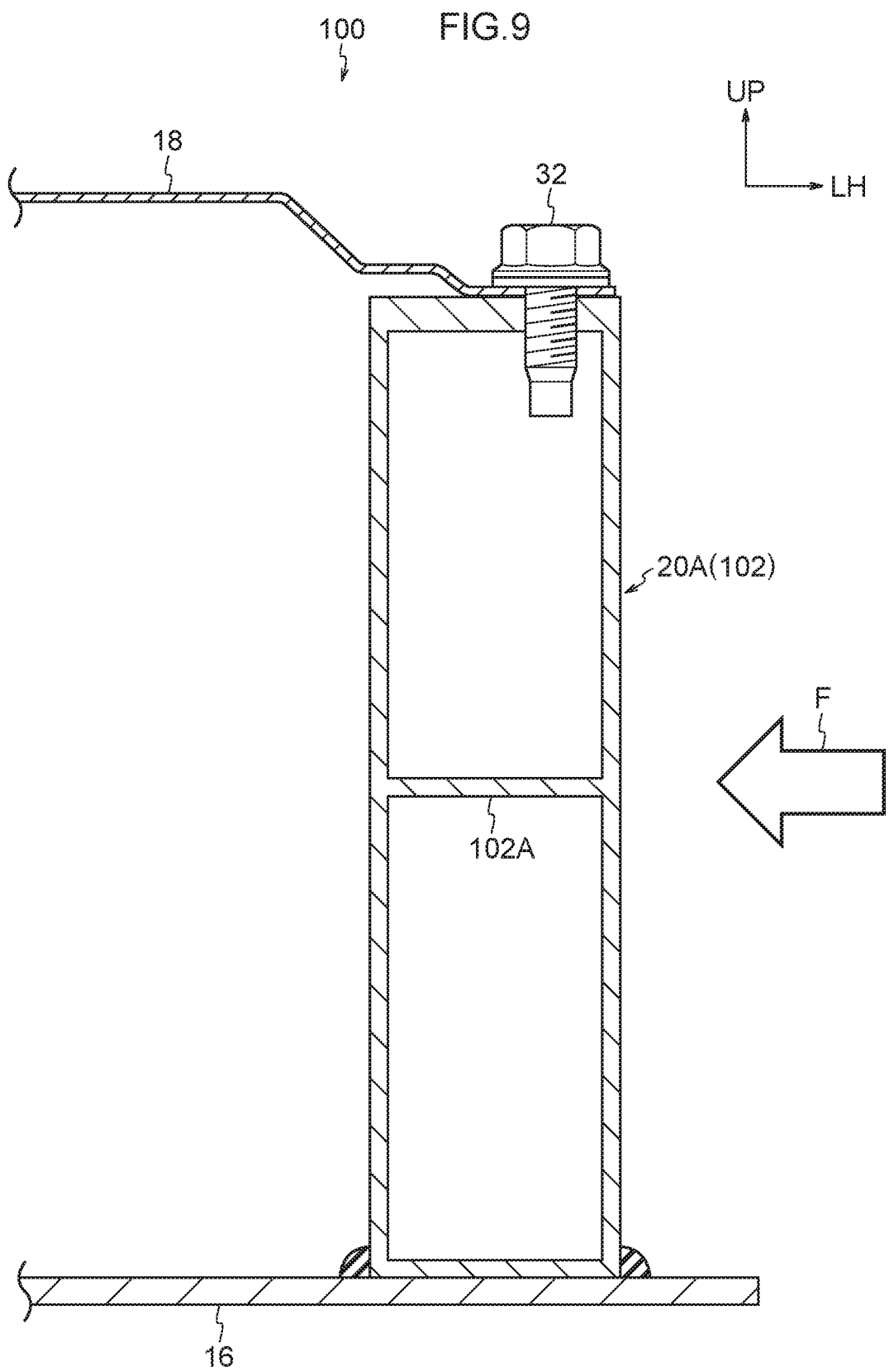
FIG. 9 is a cross-sectional view showing a partial structure of a battery case for a vehicle relating to a first comparative example.
Figure 10:
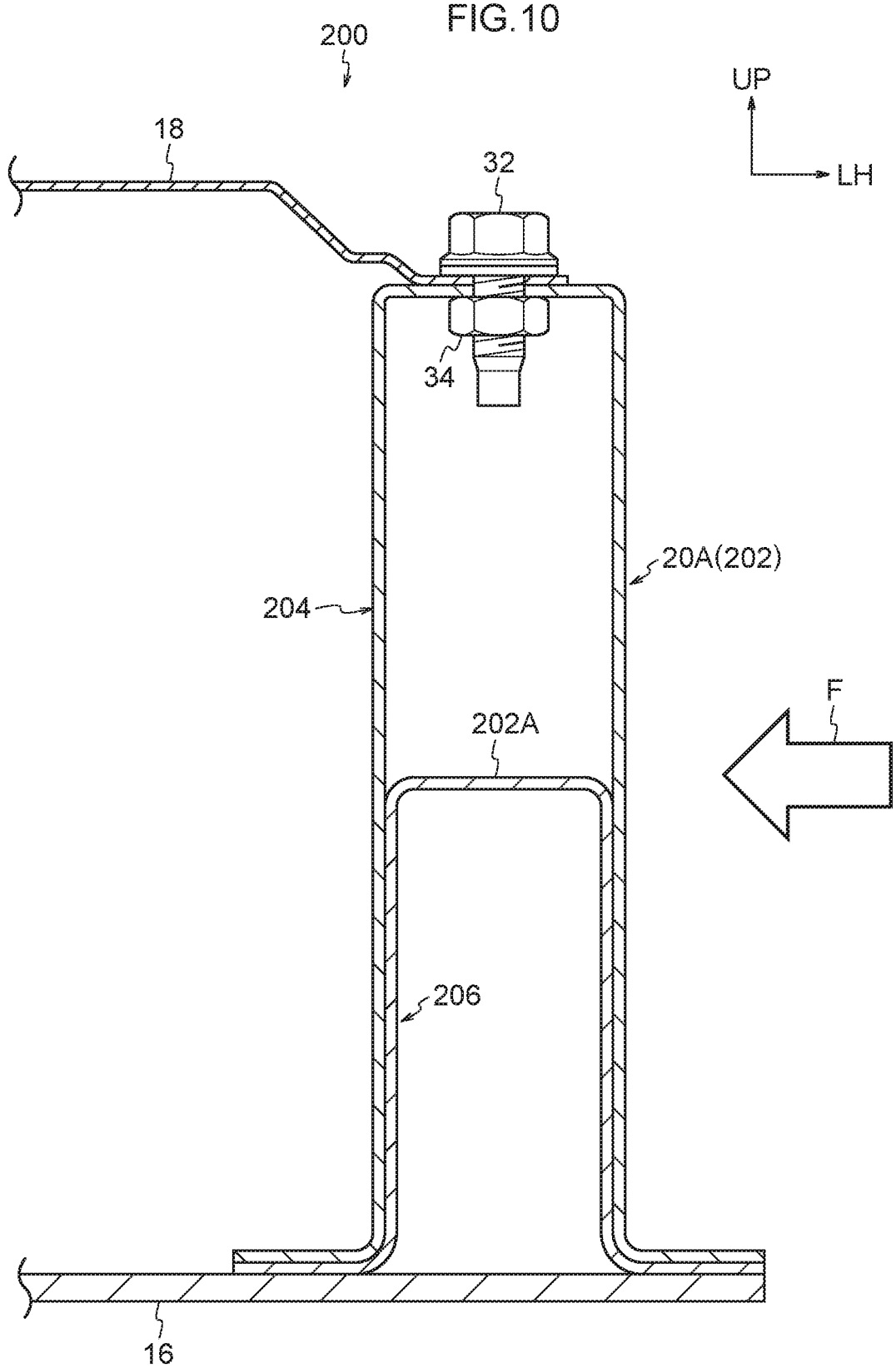
FIG. 10 is a cross-sectional view showing a partial structure of a battery case for a vehicle relating to a second comparative example.
Figure 11:
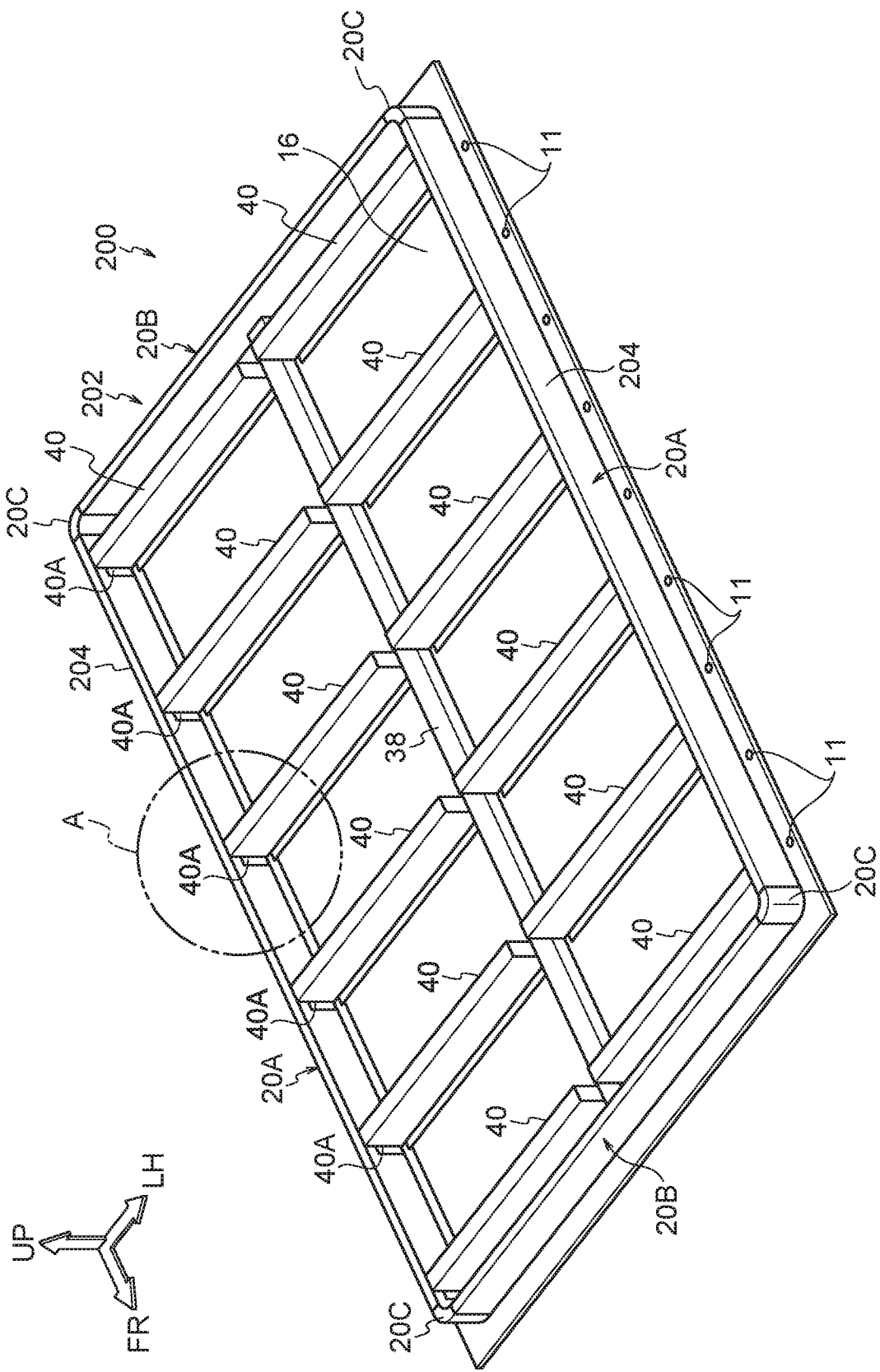
FIG. 11 is a perspective view showing a state in which the upper lid has been removed from the battery case for a vehicle relating to the second comparative example.

Supplemental description of the above-described effects will be given by using the comparative examples that are illustrated in FIG. 9 through FIG. 13. The partial structure of a battery case 100 for a vehicle relating to a first comparative example (hereinafter called "first comparative example 100") is shown in a cross-sectional view in FIG. 9. The partial structure of a battery case 200 for a vehicle relating to a second comparative example (hereinafter called "second comparative example 200") is shown in a cross-sectional view in FIG. 10. Further, a state in which the upper lid 18 has been removed from the second comparative example 200 is shown in a perspective view in FIG. 11, and the region indicated by letter A in FIG. 11 is shown in an enlarged perspective view in FIG. 12. Moreover, the situation at the time when a side wall 202 of the second comparative example 200 and the cross beam 40 are spot welded is shown in a cross-sectional view in FIG. 13. Note that, in FIG. 9 through FIG. 13, structures that are basically similar to those of the present embodiment are denoted by the same reference numerals.

Here, the function of protecting the incorporated battery and the like from external force of a collision or the like is expected of the battery case of a battery pack that is installed beneath the floor of a vehicle. In particular, it is expected that, in order to protect the battery, the side wall that is positioned at the outer peripheral portion of the battery case hardly deforms at all even if external force is applied. Therefore, it is desirable that, when external force is applied to the side wall, the side wall transmits load to the cross beams (supporting members) without the cross-section of the side wall collapsing, and there is little bending deformation between the cross beams.

From the standpoint of realizing the above-described transmitting of load to the cross beams without the cross-section of the side wall collapsing, and bending deformation of the side wall between the cross beams being small, it is preferable that the cross-section of a side wall 102 (the rectilinear portion 20A) be a closed cross-sectional shape, and that a lateral wall portion (bridging portion) 102A that can transmit load exist at the interior of the closed cross-section of the rectilinear portion 20A, as in the battery case 100 for a vehicle that is shown in FIG. 9. The first comparative example 100 that is shown in FIG. 9 is an example in which the rectilinear portion 20A of the side wall 102 is manufactured by extrusion molding aluminum, but there is the problem that aluminum is expensive as compared with a steel plate. Thus, an example in which a performance that is similar to that of the first comparative example 100 is realized by combination a steel plate is shown in FIG. 10.

Figure 12:
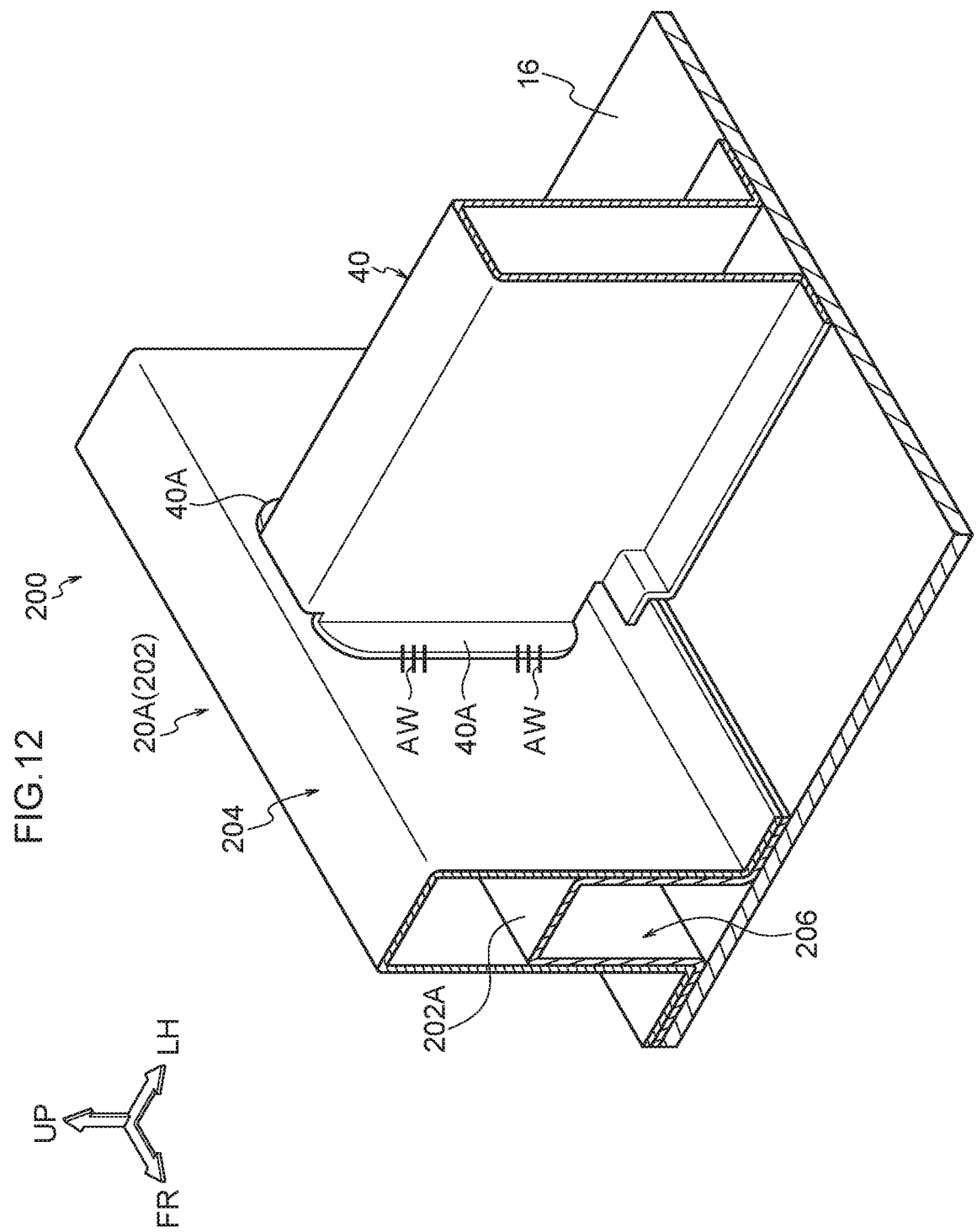
FIG. 12 is a perspective view showing, in an enlarged manner, the region denoted by letter A in FIG. 11.

In the second comparative example 200 that is shown in FIG. 10, the side wall 202 (the rectilinear portion 20A), which has a lateral wall portion (bridging portion) 202A that is similar to the above-described lateral wall portion 102A, is formed by combining two steel plates 204, 206 that have hat-shaped cross-sections. As shown in FIG. 11 and FIG. 12, the cross beams 40 abut this side wall 202. At this abutting portion, it is preferable that the side wall 202 and the cross beam 40 be joined (united) by welding or the like. In this case, when trying to join the cross beam 40 and the side wall 202 easily, they are joined by arc welding (refer to arc welded portions AW in FIG. 12). When the cross beam 40 and the side wall 202 are joined by arc welding, problems arise such as the cost increases because the production efficiency is poor, and the battery case warps due to heat after the joining because the amount of inputted heat is large, and the like. Further, blind rivets or the like may be used instead of arc welding, but the cost increases in this case as well.

Figure 13:
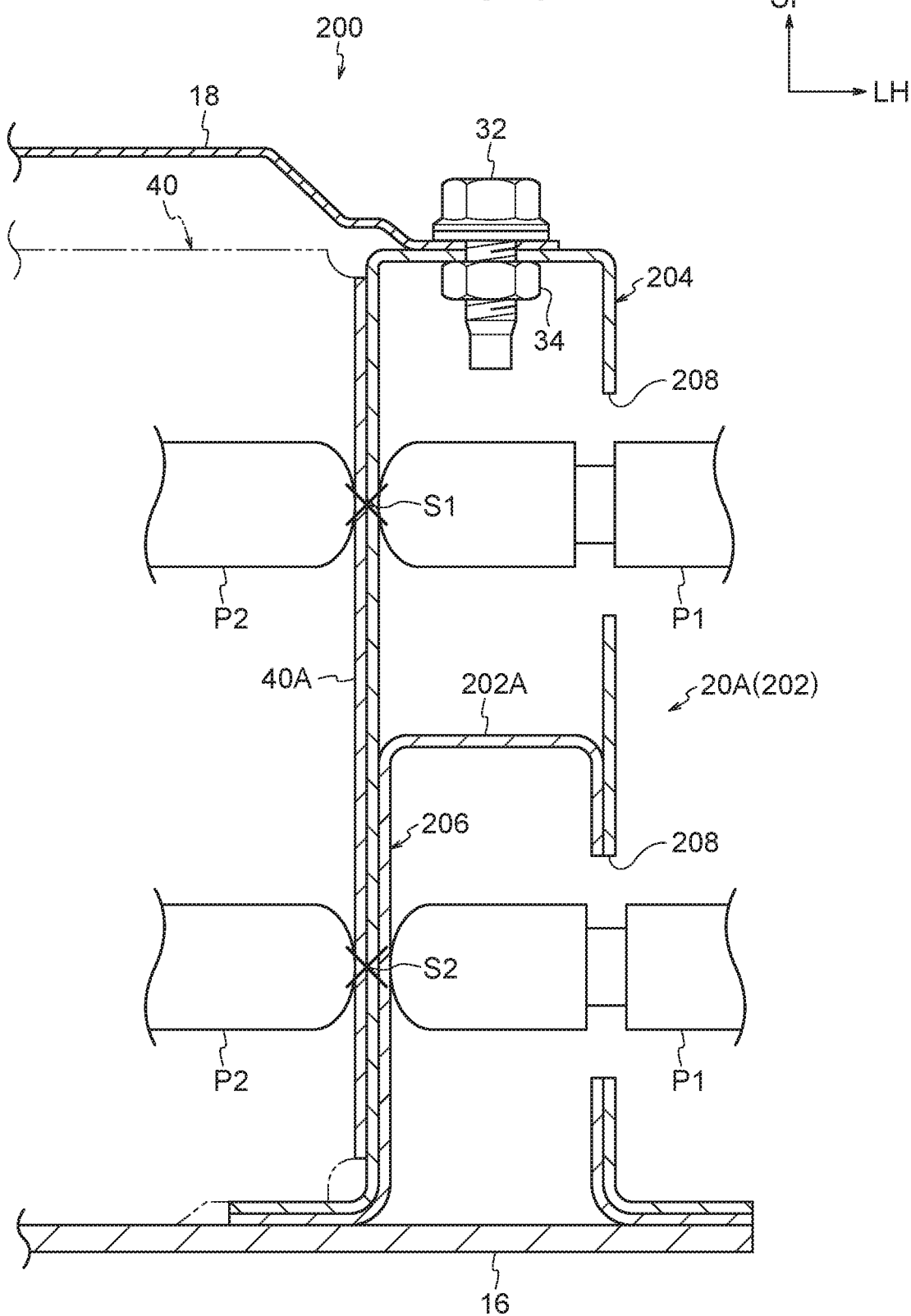
FIG. 13 is a cross-sectional view showing the situation at the time when a side wall and a supporting member of the battery case for a vehicle relating to the second comparative example are spot welded.

On the other hand, if spot welding is used instead of arc welding, the production efficiency increases, the cost is low, and also, there are few effects due to heat. Therefore, joining the cross beam 40 and the side wall 202 by using spot welding is desirable. However, in the cases of the side walls 102, 202 that have closed cross-sectional shapes such as shown in FIG. 9 and FIG. 10, one of the pair of electrodes that a gun for spot welding has does not reach the portion to be welded. Therefore, for example, as shown in FIG. 13, work holes (openings) 208 for passage of one electrode P1 of a pair of electrodes P1, P2 of the gun for spot welding must be formed in the side wall 202. However, disadvantages arise if the work holes 208 are formed in the side wall 202.

With regard to this point, in the present embodiment, due to the above-described characteristic structure, although there is the side wall 20 that has the rectilinear portion 20A that has a closed cross-sectional shape, the rectilinear portion 20A and the cross beam 40 can be joined merely by spot welding, without forming work holes in the rectilinear portion 20A. As a result, the battery case 10 can manufactured at a low cost, and accordingly, the cost of the electric automobile 12 can be decreased.

Other embodiments of the present invention are described next. Note that structures and operation that are basically similar to those of the first embodiment are denoted by the same reference numerals as in the first embodiment, and description thereof is omitted.

Second Embodiment

Figure 14:
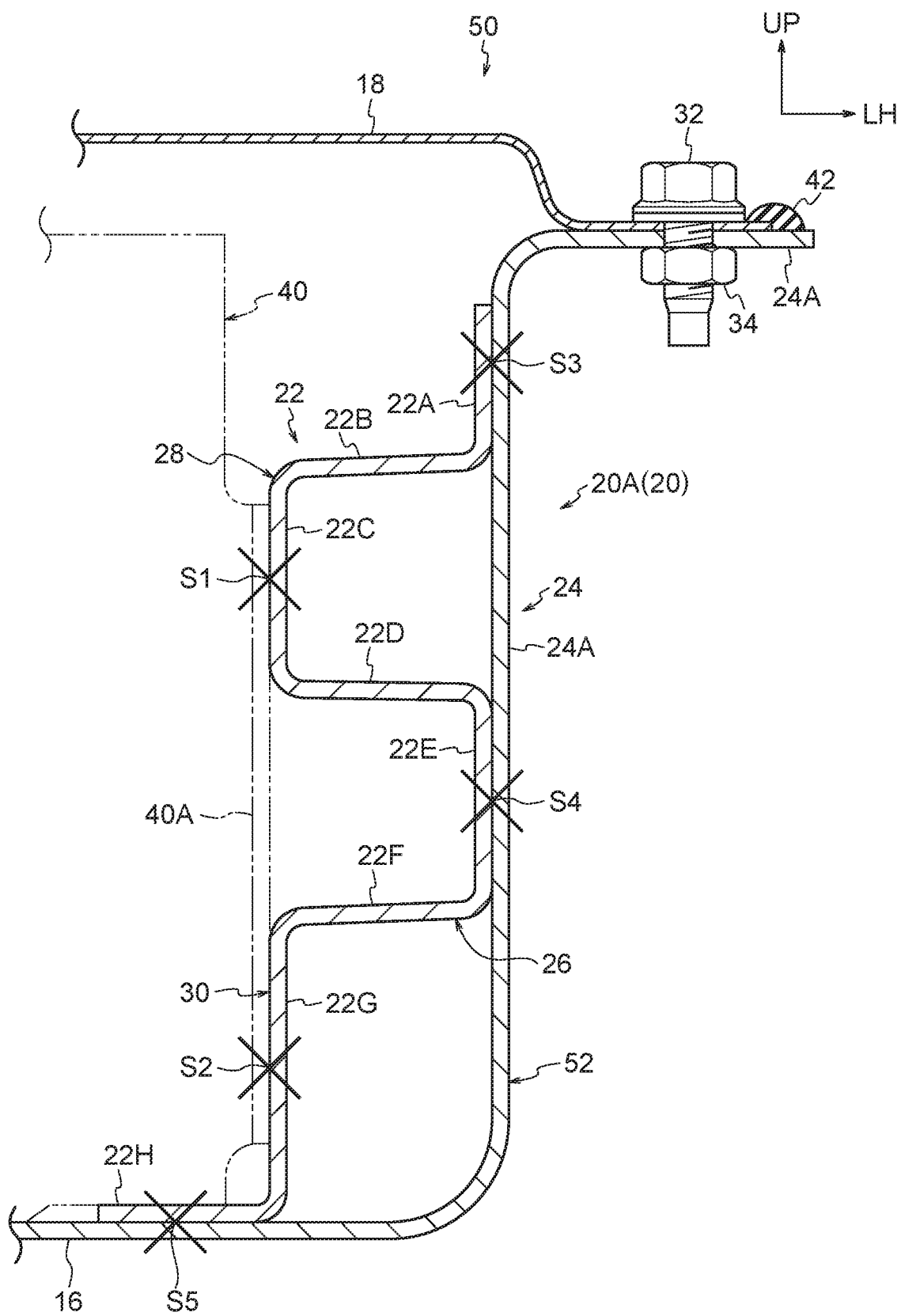
FIG. 14 is a cross-sectional view showing a partial structure of a battery case for a vehicle relating to a second embodiment.

The partial structure of a battery case 50 for a vehicle that relates to a second embodiment of the present disclosure is shown in a cross-sectional view in FIG. 14. Note that the cross beams 40 and the weld points S1, S2 that do not exist in the cross-section shown in FIG. 14 are shown by imaginary lines in FIG. 14. In this embodiment, the lower flange portion 24C is not provided at the lower end portion of the outer panel 24, and the lower end portion of the outer panel 24 is made integral with the bottom plate 16 (is connected integrally with the bottom plate 16). Namely, in this embodiment, the bottom plate 16 and the outer panels 24 are formed integrally from a single steel plate 52 that is press-molded. This steel plate 52 is molded in the shape of a box whose upper side is open for example. The upper flange portion 24B of the outer panel 24 extends-out toward the vehicle transverse direction outer side from the upper end portion of the vertical wall portion 24A.

At the time of manufacturing this battery case 50 for a vehicle, first, the lateral flange portions 40A of the cross beams 40 and the inner panels 22 are joined by spot welding (refer to the weld points S1, S2 of FIG. 14). Next inner panels 22 and the cross beams 40 are placed on the bottom plate 16, and the inner panels 22 and the outer panels 24 are joined by spot welding (refer to the weld points S3, S4 in FIG. 14). Next, the inner panels 22 and the bottom plate 16 are joined by spot welding (refer to the weld point S5 in FIG. 14). In this embodiment, structures other than those described above are similar to those of the first embodiment.

In this embodiment as well, operation and effects that are basically similar to those of the first embodiment are obtained. Moreover, because the outer panels 24 and the bottom plate 16 are formed by the single steel plate 52, the number of parts and the number of spot welding processes can be reduced.

Third Embodiment

The partial structure of a battery case 60 for a vehicle that relates to a third embodiment of the present invention is shown in a cross-sectional view in FIG. 15. Note that the cross beams 40 and the weld points S1, S2, S7, S8 that do not exist in the cross-section shown in FIG. 15 are shown by imaginary lines in FIG. 15. In this embodiment, the inner panel 22 does not have the bulging portion 26, and the upper side beam joining portion 22C and the lower side beam joining portion 22G are joined in a rectilinear shape in cross-section via a lower side outer joining portion 22E'. Further, a bulging portion 27, which bulges-out toward the inner panel 22 side and is joined to the inner panel 22, is formed at the vertical direction intermediate portion of the outer panel 24.

This bulging portion 27 is formed in a substantial U-shape in cross-section whose vehicle transverse direction outer side is open, as seen from the vehicle longitudinal direction. The bulging portion 27 is structured by upper and lower lateral wall portions 24A1, 24A3 that extend substantially in the vehicle horizontal direction, and an inner joining portion 24A2 that vertically connects the vehicle transverse direction inner side end portions of the upper and lower lateral wall portions 24A1, 24A3. The inner joining portion 24A2 and the above-described lower side outer joining portion 22E' are joined in the vehicle transverse direction by spot welding. In this embodiment, structures other than those described above are similar to those of the first embodiment.

In this embodiment as well, operation and effects that are basically similar to those of the first embodiment are obtained. However, in this embodiment, it is preferable to add a member for suppressing deformation of the closed cross-section portion 28 due to load from the vehicle transverse direction outer side (the above-described matchbox deformation) For example, a mounting bracket 62 (refer to FIG. 15) for mounting the battery case 60 for a vehicle to the vehicle body can be used as this additional member.

The mounting bracket 62 is formed by, for example, a steel plate being bent into an L-shape in cross-section, and is structured by a vertical wall portion 624 that extends in the vehicle vertical direction, and an upper wall portion 62B that extends toward the vehicle transverse direction outer side from the upper end of the vertical wall portion 62A. The vertical wall portion 62A is joined by spot welding to the vertical wall portion 24A of the outer panel 24 (refer to the weld points S7, S8 of FIG. 15), and connects the upper and lower closed cross-section portions 28, 30. Further, the upper wall portion 62B is superposed with the bottom surface of a frame member (e.g., a side member) of the vehicle body, and is fixed to this frame member by means such as fastening by bolts or the like. Note that, in the present embodiment, there may be a structure in which the lower end portion of the inner panel 22 is made integral with the bottom plate 16. In this case, there is a structure in which, for example, the lower end portion of the outer panel 24 is superposed on the lower end portion of the inner panel 22 from the vehicle transverse direction outer side, and is joined thereto by spot welding.

Fourth Embodiment

A partial structure of a battery case 70 for a vehicle relating to a fourth embodiment of the present invention is shown in a cross-sectional view in FIG. 16. In this embodiment, the bottom plate 16 is formed of aluminum, and the inner panel 22, the outer panel 24 and the cross beams 40 are joined to the bottom plate 16 by mechanical fastening by blind rivets R. Note that the blind rivets R are illustrated schematically in FIG. 16. Further, the aforementioned mechanical fastening may be fastening by bolts. In this embodiment, structures other than the above are similar to those of the first embodiment.

In the present embodiment as well, operation and effects that are basically similar to those of the first embodiment are obtained. Further, in the present embodiment, lightening of the weight can be devised by the bottom plate 16 that is made of aluminum, while the strength of the side wall 20 with respect to load from the side opposite the cross beams 40 is ensured by the inner panel 22, the outer panel 24 and the cross beams 40 that are made of steel plates.

Although several embodiments have been described above as examples, the present disclosure can be implemented by being modified in various ways within a scope that does not depart from the gist thereof. Further, the scope of the right of the present disclosure is not limited to the above-described respective embodiments.

An object of the present disclosure is to provide a battery case for a vehicle and a method of manufacturing the battery case that, in a structure in which a side wall that forms a closed cross-section and supporting members that support the side wall from a case inner side are joined by spot welding, can efficiently suppress deformation of the side wall due to load from the side opposite the supporting members, without necessitating the formation of openings for spot welding in the side wall.

A first aspect is a battery case for a vehicle that houses a battery. The battery case includes: a bottom plate, a side wall, and supporting members that are joined to the bottom plate and that support the side wall from a case inner side, wherein the battery case is installed beneath a floor of a vehicle, the side wall has an inner panel to which the supporting members are joined by spot welding, and an outer panel that faces the inner panel from a side that is opposite from the supporting members, upper portions of the inner panel and the outer panel are joined together by spot welding, and lower end portions of the inner panel and the outer panel are joined to or made integral with the bottom plate, at a vertical direction intermediate portion of one of the inner panel or the outer panel, there is formed a bulging portion which bulges out toward another of the inner panel or the outer panel and is joined to the other of the inner panel or the outer panel by spot welding, closed cross-section portions are formed at the side wall at both upper side and a lower side of the bulging portion, respectively, and weld points of the spot welding that join the inner panel and the outer panel are disposed at positions that do not overlap the supporting members as seen from a direction in which the inner panel and the outer panel face one another.

"Joined to or made integral with" in the first aspect is either of a case in which the respective lower ends of the inner panel and the outer panel are joined to the bottom plate, and a case in which the lower end of one either one of the inner panel and the outer panel is made integral with the bottom plate and the lower end of the other is joined to the bottom plate.

The battery case for a vehicle of the first aspect houses a battery and is installed beneath the floor. This battery case for a vehicle has the bottom plate, the side wall, and the supporting members that are joined to the bottom plate and that support the side wall from the case inner side. The side wall has the inner panel to which the supporting members are joined by spot welding, and the outer panel that faces the inner panel from the side opposite the supporting members. The upper portions of the inner panel and the outer panel are joined together by spot welding. The lower end portions of the inner panel and the outer panel are joined to or are made integral with the bottom plate. Further, at the vertical direction intermediate portion of one of the inner panel and the outer panel, a bulging portion, which bulges-out toward the other and is joined to the other by spot welding, is formed. Closed cross-section portions are formed at the side wall at the upper and lower both sides of the bulging portion, respectively.

Here, the weld points of the spot welding that join the inner panel and the outer as described above are disposed at positions that do not overlap the supporting members as seen from the direction in which the inner panel and the outer panel face one another. Therefore, at the time of joining the side wall, which has a closed cross-section, and the supporting members, which support the side wall from the case inner side, by spot welding as described above, first, the supporting members and the inner panel are spot welded, and thereafter, it suffices to spot weld the inner panel and the outer panel at the above-described non-overlapping positions, and there is no need to form openings for the insertion of a gun for spot welding in the side wall. Moreover, the bulging portion that is provided at one of the inner panel and the outer panel, i.e., a portion of the side wall, suppresses deformation of the side wall due to load from the side opposite the supporting members (hereinafter simply called "load"), and therefore, deformation of the side wall can be suppressed efficiently.

A second aspect is the first aspect of the battery case for a vehicle, wherein the bulging portion is formed at the vertical direction intermediate portion of the inner panel.

In accordance with the battery case for a vehicle of the second aspect, the bulging portion, which bulges-out toward the outer panel side and is joined to the outer panel, is formed at the vertical direction intermediate portion of the inner panel that side wall has. Here, in a case in which a bulging portion that bulges-out toward the inner panel side is formed at the vertical direction intermediate portion of the outer panel, a recess is formed in the outer panel at the surface thereof that is at the side opposite the inner panel (the surface that is at the case outer side). Therefore, there is the possibility that water or foreign matter or the like will collect in this recess, but this can be avoided in the present disclosure.

A third aspect of the second aspect of the battery case for a vehicle, wherein the respective closed cross-section portions are joined to the supporting members.

In accordance with the battery case for a vehicle of the third aspect, the closed cross-section portions, which are formed at the upper and lower both sides of the bulging portion at the side wall respectively, are joined to the supporting members. Due thereto, the upper and lower closed cross-section portions are connected via the supporting members, and therefore, the side wall deforming due to load can be suppressed more efficiently.

A fourth aspect of any of the first aspect to the third aspect, wherein the bottom plate, the inner panel, the outer panel and the supporting members are formed by steel plates, and the bottom plate is joined to the inner panel, the outer panel and the supporting members by spot welding.

In the battery case for a vehicle of the fourth aspect, the bottom plate, the inner panel, the outer panel and the supporting members are formed by steel plates. Therefore, as compared with a case in which these members are formed of a light metal such as aluminum or the like or an alloy thereof, the manufacturing cost can be reduced. Moreover, because the bottom plate is joined by spot welding to the inner panel, the outer panel and the supporting members, the above-described respective members can be joined by only spot welding. Accordingly, manufacturing is easy.

The fifth aspect of any of the first aspect to the third aspect, wherein the inner panel, the outer panel and the supporting members are formed by steel plates, the bottom plate is formed by a plate member that is a light metal or a light alloy, and the bottom plate is joined to the inner panel, the outer panel and the supporting members by mechanical fastening.

In the battery case for a vehicle of the fifth aspect, the inner panel, the outer panel and the supporting members that are steel plates, and the bottom plate that is a plate member of a light metal or a light alloy, are joined by mechanical fastening. Due thereto, lightening of the weight can be devised by the bottom plate that is made of a light metal or a light alloy, while the strength of the side wall with respect to load is ensured by the inner panel, the outer panel and the supporting members that are made of steel plates.

The sixth aspect of a method of manufacturing the battery case for a vehicle of the fourth aspect or fifth aspect. The method includes: joining the supporting members and the inner panel by spot welding; joining the inner panel and the outer panel by spot welding; and joining the inner panel, the outer panel and the supporting members, to the bottom plate, by spot welding or mechanical fastening.

In accordance with the method of manufacturing a battery case for a vehicle of the sixth aspect, in the first step, the supporting members and the inner panel are joined by spot welding. Next, in the second step, the inner panel and the outer panel are joined by spot welding. In the third step thereafter, the inner panel, the outer panel and the supporting members, and the bottom plate, are joined by spot welding or mechanical fastening. The battery case for a vehicle that is manufactured by these steps is similar to that of the fourth or fifth aspect, and therefore, the above-described effects are obtained thereby.

In accordance with the battery case for a vehicle and the method of manufacturing thereof relating to the present disclosure, in a structure in which a side wall that forms a closed cross-section and supporting members that support the side wall from a case inner side are joined by spot welding, deformation of the side wall due to load from the side opposite the supporting members can be suppressed efficiently, without necessitating the formation of openings for spot welding in the side wall.

What is claimed is:

1. A battery case for a vehicle that houses a battery, the battery case comprising:
   a bottom plate,
   a side wall, and
   supporting members that are joined to the bottom plate and that support the side wall from a case inner side, wherein
   the battery case is installed beneath a floor of a vehicle,
   the side wall has an inner panel to which the supporting members are joined by spot welding, and an outer panel that faces the inner panel from a side that is opposite from the supporting members,
   upper portions of the inner panel and the outer panel are joined together by spot welding, and lower end portions of the inner panel and the outer panel are joined to or made integral with the bottom plate,
   at a vertical direction intermediate portion of one of the inner panel or the outer panel, there is formed a bulging portion which bulges out toward another of the inner panel or the outer panel and is joined to the other of the inner panel or the outer panel by spot welding,
   closed cross-section portions are formed at the side wall at both an upper side and a lower side of the bulging portion, respectively, and
   weld points of the spot welding that join the inner panel and the outer panel are disposed at positions that do not overlap with the supporting members as seen from a direction in which the inner panel and the outer panel face one another.

2. The battery case for a vehicle of claim 1, wherein the bulging portion is formed at the vertical direction intermediate portion of the inner panel.

3. The battery case for a vehicle of claim 2, wherein the respective closed cross-section portions are joined to the supporting members.

4. The battery case for a vehicle of claim 1, wherein
   the bottom plate, the inner panel, the outer panel and the supporting members are formed by steel plates, and
   the bottom plate is joined to the inner panel, the outer panel and the supporting members by spot welding.

5. The battery case for a vehicle of claim 1, wherein
   the inner panel, the outer panel and the supporting members are formed by steel plates,
   the bottom plate is formed by a plate member that is a light metal or a light alloy, and
   the bottom plate is joined to the inner panel, the outer panel and the supporting members by mechanical fastening.

6. The battery case for a vehicle of claim 1, wherein
   the supporting members have, at vehicle transverse direction end portions thereof, lateral flange portions that project out toward both sides in a vehicle longitudinal direction, and
   the closed cross-section portions are connected to the lateral flange portions.

7. The battery case for a vehicle of claim 1, wherein respective lower ends of the inner panel and the outer panel are joined to the bottom plate, or a lower end of one of the inner panel or the outer panel is made integral with the bottom plate and a lower end of another of the inner panel or the outer panel is joined to the bottom plate.

8. A method of manufacturing the battery case for a vehicle of claim 4, the method comprising:
   joining the supporting members and the inner panel by spot welding;
   joining the inner panel and the outer panel by spot welding; and
   joining the inner panel, the outer panel and the supporting members, to the bottom plate, by spot welding or mechanical fastening.

* * * * *